US011856652B2

United States Patent
Jain et al.

(10) Patent No.: US 11,856,652 B2
(45) Date of Patent: *Dec. 26, 2023

(54) EFFICIENT AND RELIABLE DATA TRANSFER IN 5G SYSTEMS

(71) Applicant: Intel Corporation, Santa Clara, CA (US)

(72) Inventors: Puneet Jain, Hillsboro, OR (US); Vivek Gupta, San Jose, CA (US); Ching-Yu Liao, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/383,647

(22) Filed: Jul. 23, 2021

(65) Prior Publication Data

US 2022/0015190 A1 Jan. 13, 2022

Related U.S. Application Data

(63) Continuation of application No. 16/279,804, filed on Feb. 19, 2019, now Pat. No. 11,076,447.

(Continued)

(51) Int. Cl.
*H04W 76/12* (2018.01)
*H04W 88/06* (2009.01)
(Continued)

(52) U.S. Cl.
CPC ............. *H04W 88/06* (2013.01); *H04W 8/08* (2013.01); *H04W 8/183* (2013.01); *H04W 8/22* (2013.01);
(Continued)

(58) Field of Classification Search
CPC ..... H04W 60/00; H04W 68/005; H04W 8/08; H04W 8/183; H04W 8/22; H04W 80/10; H04W 88/023; H04W 88/06; H04W 88/02

See application file for complete search history.

(56) References Cited

U.S. PATENT DOCUMENTS 10,805,983 B2 * 10/2020 Talebi Fard .......... H04W 76/11
2004/0042465 A1 3/2004 Lee
(Continued)

OTHER PUBLICATIONS

3GPP TR 23.724, "3rd Generation Partnership Project; Technical Specification Group Services and System Aspects; Study on Cellular IoT support and evolution for the 5G System (Release 16)", V0.1.0, Jan. 2018, 21 pages.

(Continued)

*Primary Examiner* — Phuc H Tran
(74) *Attorney, Agent, or Firm* — Alliance IP, LLC

(57) ABSTRACT

Systems and methods provide solutions for reliable data transfer in a mobile communication network. A user equipment (UE) may indicate to the mobile communication network a capability of the UE to support a reliable data service protocol. The UE may process non-access stratum (NAS) messages, for both mobile originated (MO) data transfer and mobile terminated (MT) data transfer, using the reliable data service protocol to determine whether protocol data units (PDUs) of the NAS messages require no acknowledgement, require acknowledgment, or include an acknowledgement, and to detect and eliminate duplicate PDUs received at the UE in the NAS messages.

20 Claims, 17 Drawing Sheets

Related U.S. Application Data

(60) Provisional application No. 62/632,561, filed on Feb. 20, 2018.

(51) Int. Cl.
*H04W 88/02* (2009.01)
*H04W 68/00* (2009.01)
*H04W 8/18* (2009.01)
*H04W 80/10* (2009.01)
*H04W 60/00* (2009.01)
*H04W 8/08* (2009.01)
*H04W 8/22* (2009.01)

(52) U.S. Cl.
CPC ......... *H04W 60/00* (2013.01); *H04W 68/005* (2013.01); *H04W 80/10* (2013.01); *H04W 88/023* (2013.01)

(56) References Cited

U.S. PATENT DOCUMENTS

2016/0345177 A1* 11/2016 Somasundaram .... H04W 80/02
2019/0116631 A1*  4/2019 Talebi Fard .......... H04W 76/11
2022/0376873 A1* 11/2022 Lei .................... H04W 72/1289

OTHER PUBLICATIONS

3GPP TS 24.250, "3rd Generation Partnership Project; Technical Specification Group Core Network and Terminals; Protocol for Reliable Data Service between UE and SCEF; Stage 3 (Release 14)", V14.1.0, Dec. 2017, 22 pages.

* cited by examiner

EFFICIENT AND RELIABLE DATA TRANSFER IN 5G SYSTEMS

CROSS-REFERENCE TO RELATED APPLICATIONS

This application is a continuation of U.S. patent application Ser. No. 16/279,804, filed Feb. 19, 2019, which claims the benefit of U.S. Provisional Patent Application No. 62/632,561, filed Feb. 20, 2018, which are hereby incorporated by reference herein in their entirety.

TECHNICAL BACKGROUND

This application relates generally to wireless communication systems, and more specifically to reliable data service for unstructured data.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (AND SF) server, an enhanced packet data gateway (ePDG) and/or a mobility management entity (MME).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
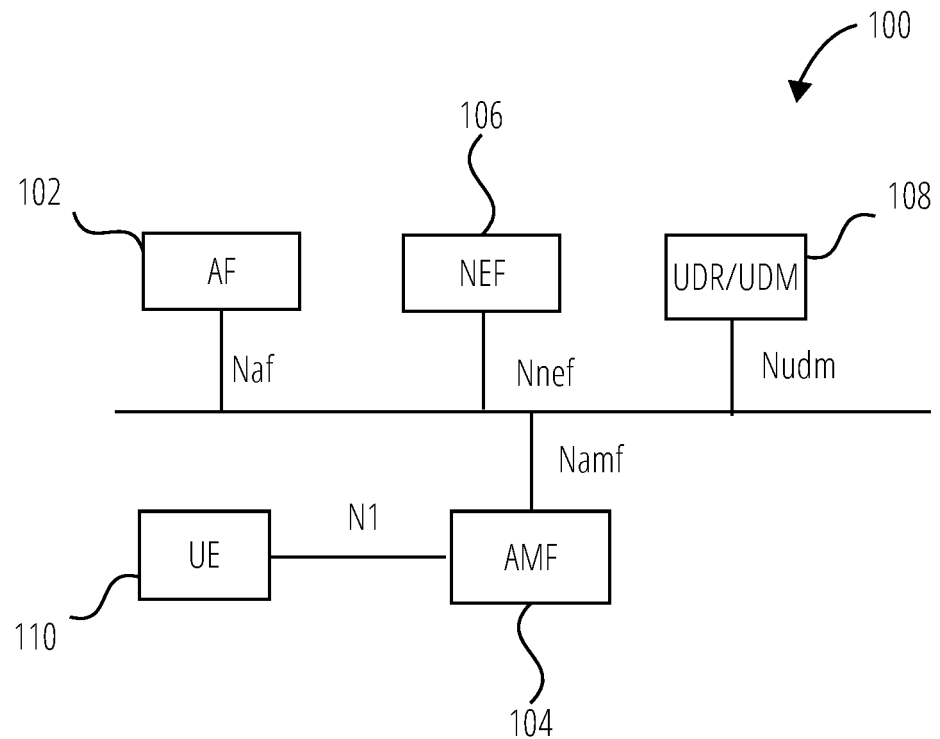
FIG. 1 illustrates an example non-roaming architecture for reliable data service (RDS) using service-based interfaces within a control plane in accordance with one embodiment.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

3GPP technical reference (TR) 23.724 on cellular internet of things (CIoT) support and evolution for 5G systems lists several requirements, including solutions to support efficient infrequent small data transmissions for low complexity, power constrained, low-mobility, and low data-rate CIoT UEs. Further there is a need to enable Reliable Data Service for unstructured data. As used herein, unstructured data may also be referred to as non-IP data.

Some of these requirements include a resource efficient system signaling load (especially over the Radio interface) with support for single/dual/multiple packet transmission (uplink (UL) or downlink (DL)). There is a need to support delivery of IP data and Unstructured (Non-IP) data. For non-IP data delivery (NIDD) of unstructured protocol data units (PDUs), there is a need to provide for reliability and the detection and elimination of duplicate packets. The sender may need, for example, to indicate whether or not the data is to be sent with reliability or not, and it may be possible to identify the sending and receiving application and indicate support for reliable communication.

Embodiments herein provide mechanisms for reliable (infrequent) small data transfer in 5G systems. In some embodiments, the Reliable Data Protocol (as specified in 3GPP technical specification (TS) 24.250) between UE and network exposure function (NEF) or other network entity such as user plane function (UPF), and non-access stratum (NAS) transport may be reused between UE and access and Mobility Management function (AMF).

Support for Reliable Data Service (RDS) involves the use of NAS transport between UE and AMF for small data delivery. This applies to both 3GPP and non-3GPP accesses. The AMF determines the NEF that is responsible for exposing this functionality for a given UE and the NEF provides support for subscription checking and actual transmission of MO/MT small data delivery to the AF/UE. The mobile originated (MO)/mobile terminated (MT) small data can be delivered for both roaming and non-roaming scenarios.

In certain embodiments, during registration procedure, a UE that wants to use RDS provides "RDS supported" indication over NAS signaling indicating the UE's capability for support of RDS. "RDS supported" indication indicates whether UE can support reliable small data delivery over NAS via 3GPP access or via both 3GPP and non-3GPP access. If the core network supports RDS functionality, the AMF includes "RDS supported" indication to the UE, and whether RDS delivery over NAS via 3GPP access or via both the 3GPP and non-3GPP access is accepted by the network. In other embodiments, the UE indicates its support for RDS in other ways. For example, in one embodiment, the UE indicates its capability of supporting RDS in protocol configuration options (PCO) and the SMF negotiates RDS support with the NEF or UPF. If the NEF or UPF supports and accepts RES, then the network indicates to the UE in the PCO that RDS will be used if enabled in the data network name (DNN) and network slice selection assistance information (NSSAI) configuration.

In certain embodiments, RDS packets are transmitted over NAS without the need to establish data radio bearers, via NAS transport message, which can carry RDS payload. UE and Network supports RDS protocol as specified in 3GPP TS 24.250.

In certain embodiments, "RDS Supported" (or similar indication e.g. "Small Data over NAS supported") is provided by UE to the (R)AN node (e.g. gNB) during RRC connection establishment (e.g., in an RRC message), which is used by gNB for appropriate AMF selection.

In certain embodiments, when reliability is not needed or provided at an application layer, small data may be transferred using the same mechanism. In this case Reliable Data Protocol (as specified in TS 24.250) between UE and AMF is not needed. In this case instead of "RDS supported," other indication for "Small Data over NAS supported" indication may be provided. In certain embodiments such NAS indication may be referred by other names.

Certain embodiments herein do not require establishment of a PDU session and can transfer data over control plane connection. This saves signaling for PDU session establishment. However in certain embodiments, the solution may rely on PDU session establishment of type "unstructured data" for reliable small data transfer. In such embodiments, AMF interacts with SMF for PDU session establishment prior to sending and receiving data. Such interactions are not shown in the architectural diagram and procedures for the sake of simplicity, but are further explained where needed. RDS between the UE and NEF or UPF when using a PDU session of PDU Type "unstructured" provides a mechanism for the NEF or UPF to determine if the data was successfully delivered to the UE and for UE to determine if the data was successfully delivered to the NEF or UPF. When a requested acknowledgement is not received, the RDS retransmits the packet. The service is enabled or disabled based on DNN and NSSAI configuration per service level agreement (SLA). When the service is enabled, a protocol is used between the end-points of the unstructured PDU Session. The protocol uses a packet header to identify if the packet requires no acknowledgement, requires an acknowledgement, or is an acknowledgment and to allow detection and elimination of duplicate PDUs at the receiving endpoint. Port Numbers in the header are used to identify the application on the originator and to identify the application on the receiver. The header is configured based on Reliable Data Service configuration information which is obtained in the NIDD configuration, MT NIDD, and MO NIDD procedures with the AF as specified in TS 23.502.

In certain embodiments AMF (and/or NEF) may interact with policy control function (PCF) instead of UDM/UDR for subscription information and policy related information. In certain embodiments for reliable small data delivery actions performed by NEF in this disclosure may be replaced by other functional entity (e.g., PCF).

FIG. 1 illustrates an example non-roaming architecture 100 for RDS using service-based interfaces within a control plane according to one embodiment. The example non-roaming architecture 100 comprises an AF 102, an AMF 104, a NEF 106, a UDR/UDM 108, and a UE 110 and corresponding interfaces Naf, Nnef, Nudm, Namf, and N1. Additional description of architectures with service-based interfaces is provided herein below.

Figure 2:
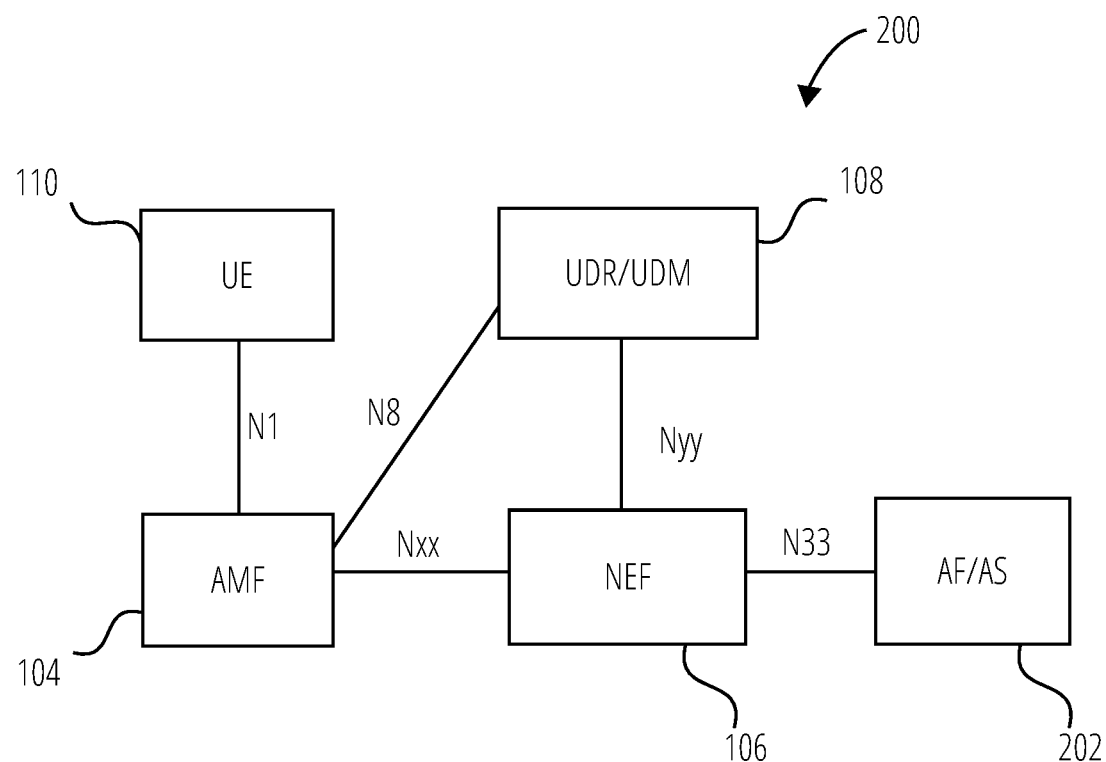
FIG. 2 illustrates an example non-roaming architecture to support RDS using reference point representation in accordance with one embodiment.

FIG. 2 illustrates an example non-roaming architecture 200 to support RDS using reference point representation in accordance with one embodiment. The example non-roaming architecture 200 comprises a UE 110, an AMF 104, a UDR/UDM 108, a NEF 106, and an AF/AS 202 and corresponding reference points N1, N8, Nxx, Nyy, and N33. Additional architecture details are provided below.

Figure 3:
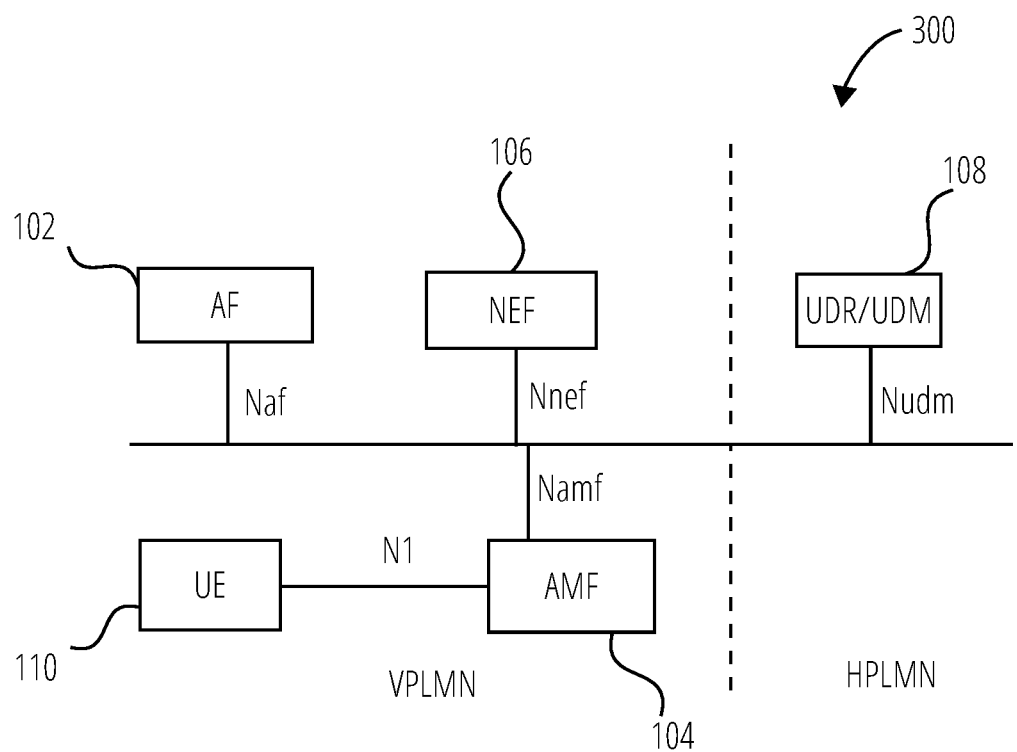
FIG. 3 illustrates a roaming architecture to support RDS using service-based interfaces within the control plane in accordance with one embodiment.

FIG. 3 illustrates a roaming architecture 300 to support RDS using service-based interfaces within the control plane in accordance with one embodiment. The roaming architecture 300 comprises an AF 102, a NEF 106, a UDR/UDM 108, an AMF 104, and a UE 110 and corresponding interfaces Naf, Nnef, Nudm, N1, and Namf. The UDR/UDM 108 is shown within a home public land mobile network (HPLMN) and the AF 102, NEF 106, AMF 104, and UE 110 are shown within a visited public land mobile network (VPLMN).

Figure 4:
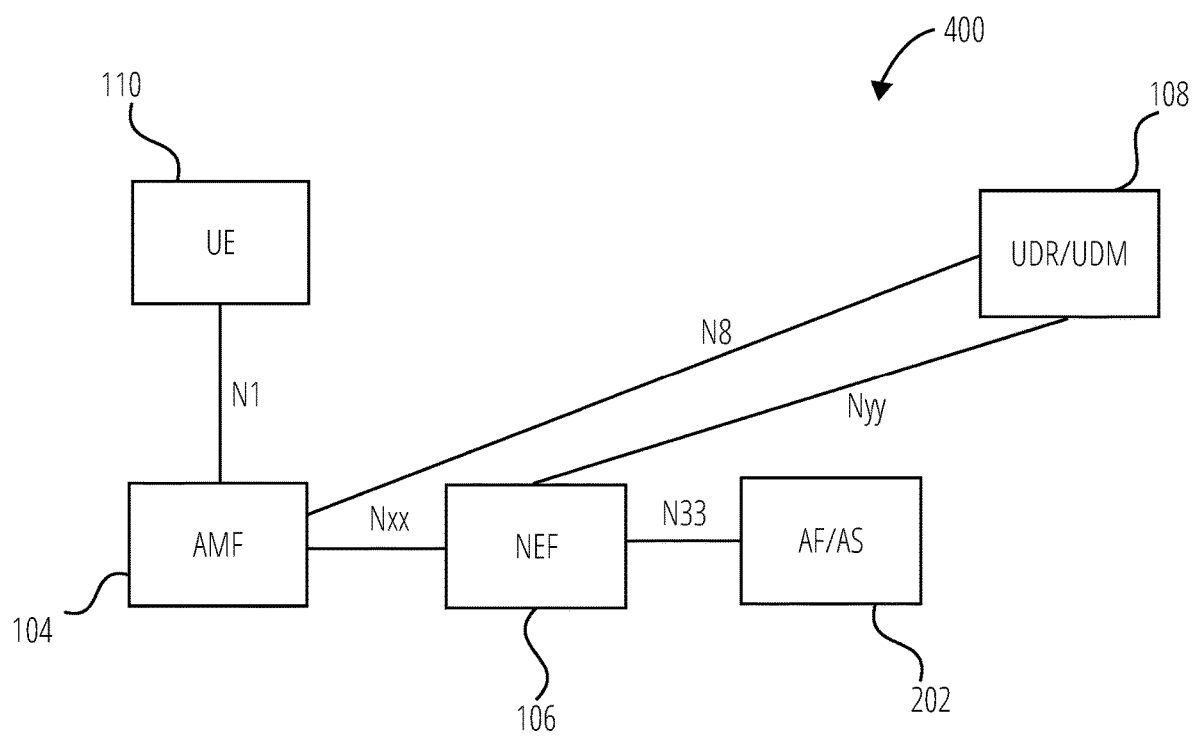
FIG. 4 illustrates a roaming architecture to support RDS using the reference point representation in accordance with one embodiment.

FIG. 4 illustrates a roaming architecture 400 to support RDS using the reference point representation in accordance with one embodiment. The roaming architecture 400 comprises a UE 110, an AMF 104, a NEF 106, an AF/AS 202, and a UDR/UDM 108 and corresponding reference points N1, Nxx, N33, N8, and Nyy. The UDR/UDM 108 is shown within an HPLMN and the UE 110, AMF 104, NEF 106, and AF/AS 202 are shown within a VPLMN. In this disclosure, Nxx is new reference point between the AMF 104 and the NEF 106, and Nyy is a new reference point between the NEF 106 and the UDR/UDM 108. In various embodiments, the NEF 106 may also use directly services from a UDR (without involving the UDR/UDM 108) via the Nyy reference point.

In certain embodiments that provide PDU session establishment prior to small data transfer, the AMF 104 interacts with an SMF (not shown in FIG. 4) via N11 reference point (for non-roaming) and via N11/N16 reference point (for roaming). In service based architecture, the SMF is connected via Nsmf reference point to the message bus.

When the RDS is enabled, a protocol is used between the end-points, i.e., between the UE 110 and the NEF 106. In certain embodiments, the protocol uses an RDS header to identify if the packet requires no acknowledgement, requires an acknowledgement, or is an acknowledgment and to allow detection and elimination of duplicate PDUs at the receiving endpoint. Also port numbers in the header are used to identify the application on the originator and to identify the application on the receiver.

Figure 5:
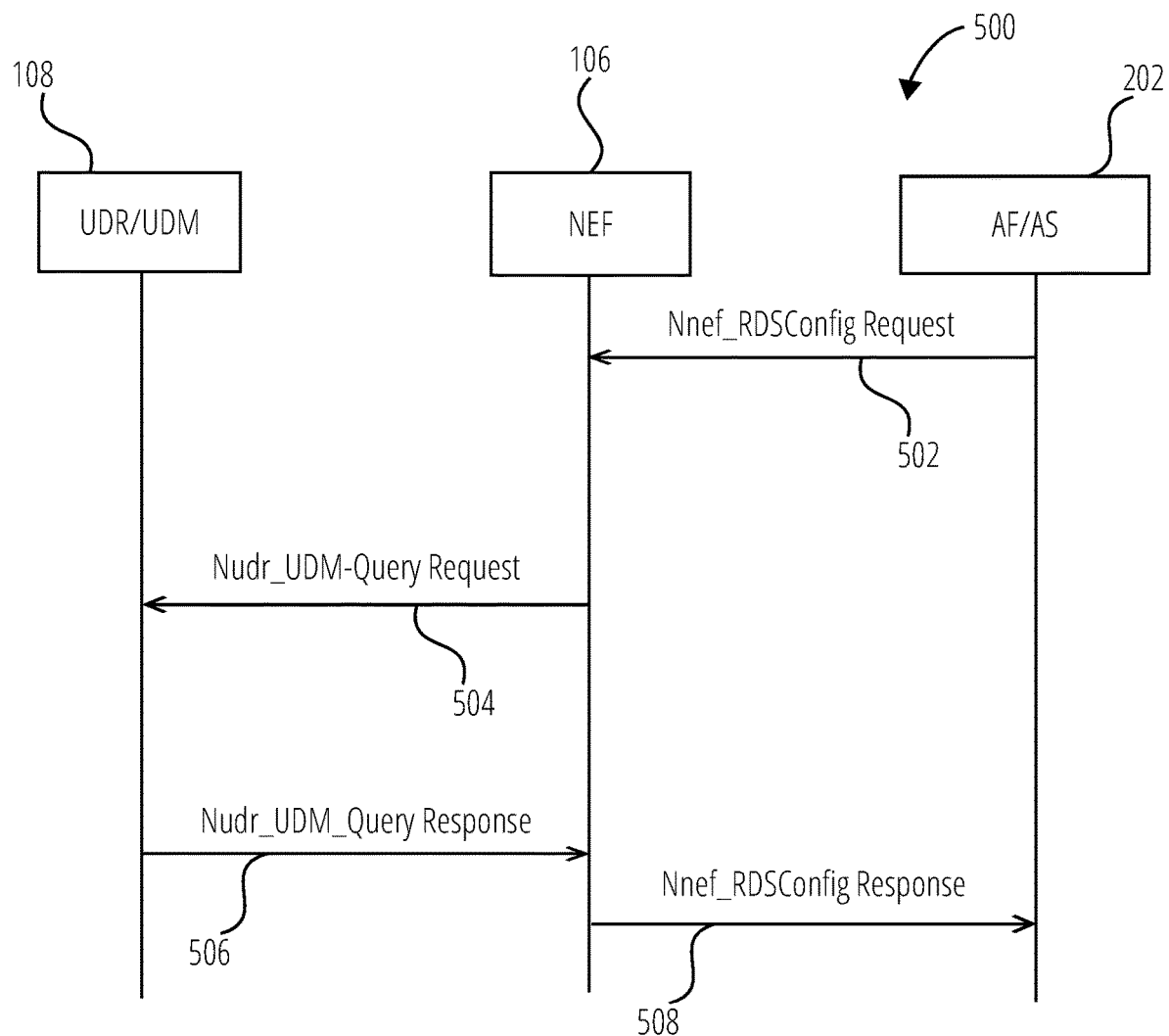
FIG. 5 illustrates an RDS configuration procedure in accordance with one embodiment.

FIG. 5 illustrates an RDS configuration procedure 500 between a NEF 106 and an AF/AS 202 in accordance with one embodiment. The RDS configuration procedure 500 is used to configure information used for RDS at the NEF 106 and the UDR/UDM 108. In order to avoid MO reliable small data delivery failure, the RDS configuration procedure may be performed, according to certain embodiments, by the AF/AS 202 prior to the UE 110 requesting to send MO reliable small data delivery.

The AF/AS 202 uses a Nnef_RDSConfig Request 502 service operation to establish routing information in UE context at the NEF 106. The Nnef_RDSConfig Request 502 may be referred to by other names, such as an Nnef_NIDD-Configuration_Create Request. The AF/AS 202 provides an external identifier for UE message and reliable data service configuration information (e.g., application port number) to the NEF 106. In certain embodiments, the request may include a general public subscription identifier (GPSI), an AF ID, a non-IP data delivery (NIDD) duration, and/or a T8 destination address. The NEF 106 may store the information provided in the request and may respond to the 202 with an indication that the AF/AS 202 is not authorized or the request is malformed.

The NEF 106 uses a Nudr_UDM-Query Request 504 service operation to check if RDS configuration request for the received external identifier is authorized, and to receive necessary information for RDS, if required. The Nudr_UDM-Query Request 504 may be referred to by other names, such as a Nudm_NIDDAuthorization_Get Request (e.g., to get authorization for UEs that belong to a GPSI, received external identifier, or mobile stationary international subscriber directory number (MSISDN), and to receive information for NIDD). The UDR/UDM 108 examines the Nudr_UDM-Query Request 504, e.g. with regard to the existence of the external identifier (or GPSI), and maps the external identifier (or GPSI) to a subscription permanent identifier (SUPI). The UDR/UDM 108 may also update a NEF ID filed of subscription data for a provided DNN and S-NSSAI with the requesting NEF's ID.

The UDR/UDM 108 sends a Nudr_UDM_Query Response 506 (including the SUPI and a Result) to the NEF 106 to acknowledge acceptance of the RDS authorization. The Nudr_UDM_Query Response 506 may be referred to by other names, such as Nudm_NIDDAuthorization_Get Response (e.g., including the SUPI, GPSI, and Result) to allow the NEF 106 to correlate the AF request to an SMF-NEF connection establishment for each UE or each group member UE.

The NEF 106 uses a Nnef_RDSConfig Response 508 service operation to acknowledge acceptance of the RDS configuration request to the AF/AS 202. If the RDS configuration was accepted, the NEF 106 will create an association between the External Identifier and SUPI in UE context. In the MT reliable small data delivery procedure, the NEF 106 will use External Identifier to determine the SUPI and receiver port number. In the MO reliable small data delivery procedure, the NEF 106 will use the SUPI, to determine AS/AF address and application port number from the UE context. The Nnef_RDSConfig Response 508 may be referred to by other names, such as an Nnef_NIDDConfiguration_Create Response, wherein in MT the NEF 106 uses TLTRI and GPSI to determine the SUPI and PDU session ID of the PDU session for delivering non-IP data, and in MO the NEF 106 uses the SUPI and PDU session ID to obtain the TLTRI and GPSI.

If PDU session establishment is needed prior to small data transfer, the AMF interacts with the SMF (not shown in FIG. 5) via N11 reference point (for non-roaming) and via N11/N16 reference point (for roaming). In Service based architecture, the SMF may be connected via the Nsmf reference point to the message bus. If PDU session is established between UE and NEF, the NEF maintains the association of PDU session ID, UE External Identifier, UE Identity (e.g., SUPI), port number, and DNN for routing UL/DL PDUs.

Figure 6:
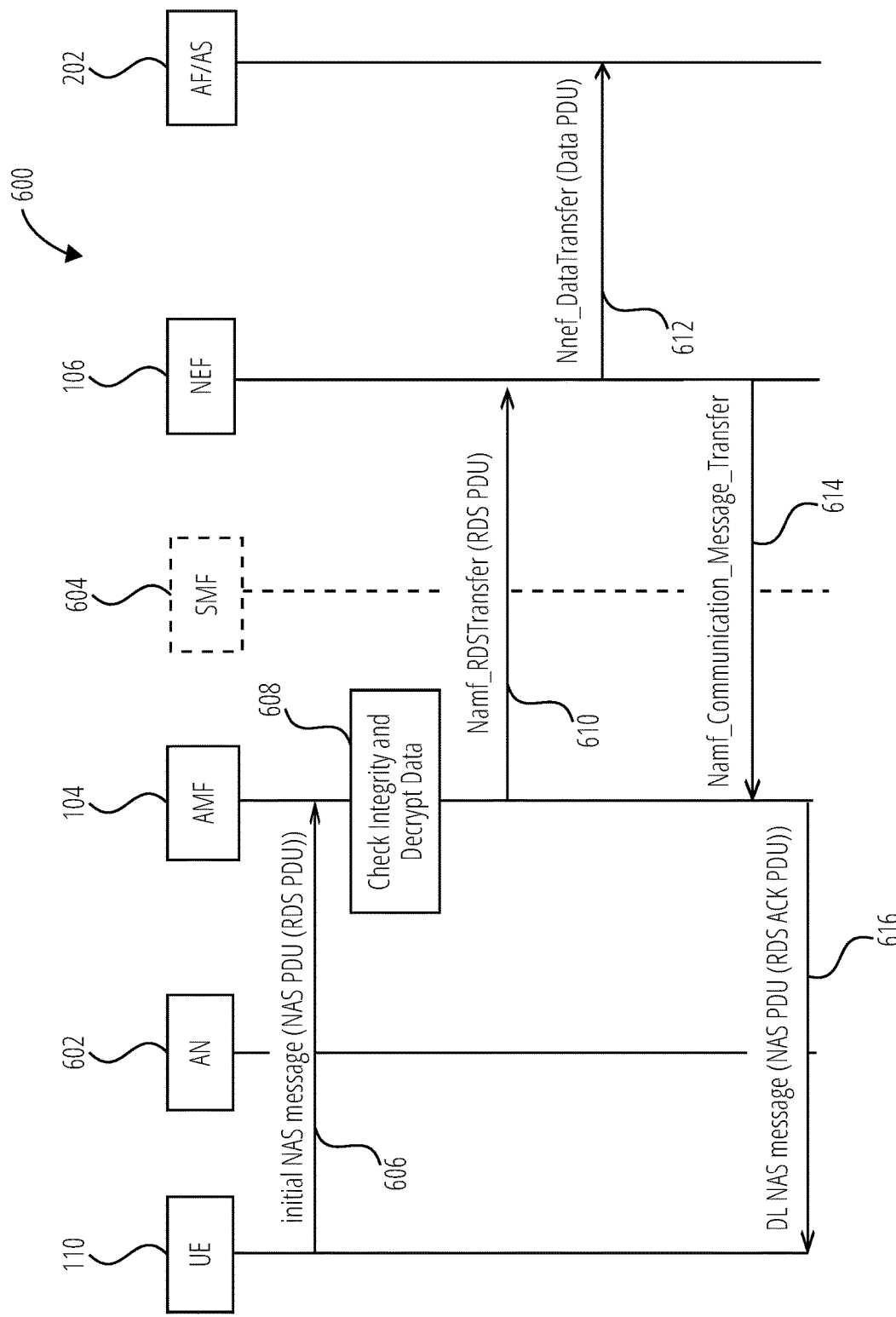
FIG. 6 illustrates an MO data delivery procedure in accordance with one embodiment.

FIG. 6 illustrates an MO data delivery procedure 600 in accordance with one embodiment. The MO data delivery procedure 600 may be used, for example, for MO reliable small data delivery. In certain embodiments, the MO data delivery procedure 600 shown in FIG. 6 assumes that the UE 110 is registered with the network.

In certain embodiments, the UE 110 sends an integrity protected NAS PDU to the AMF 104 via an access node (AN) (shown as AN 602. The AN 602 may be a 3GPP or non-3GPP access node. For example, in certain embodiments, the AN 602 is a NG-RAN (also referred to as a gNB, NR-RAN, etc.). The NAS PDU carries the UL RDS PDU data and indication for reliable small data delivery. The UE 110 may also provide release assistance information to the AMF 104 indicating if this is the last PDU. The AMF 104 may use this information to release the connection with AN 602.

The AMF 104 performs check integrity and decrypts data process 608 to check the integrity of the incoming NAS PDU and decrypts the PDU data.

The AMF 104 determines the NEF 106 based on the UE context and performs a Namf_RDSTransfer service operation 610 to send the RDS PDU to the NEF 106 along with UE identity (e.g., SUPI).

The NEF 106 sends the data PDU to the AF/AS 202 according to UE context using a Nnef_DataTransfer service operation 612.

The NEF 106 sends RDS acknowledgement to AMF using Namf_Communication_Message_Transfer service operation 614.

The AMF 104 encrypts the RDS acknowledgement PDU and sends it to the UE 110 in a DL NAS message 616.

NAS messages shown in FIG. 6 are used as examples only. Actual names for NAS messages may differ or different NAS messages may be used for sending and receiving RDS PDU/ACK.

In certain embodiments, PDU session is established between the UE 110 and the NEF 106. In such embodiments, the following additional operations may be performed. The UE 110 may send a PDU session ID as part of the initial NAS message 606, wherein the PDU session ID and/or the uplink data may be ciphered. The AMF 104 determines an SMF 604 (either home or visited) based on the PDU session ID and routes UL RDS PDU to the SMF 604 for the PDU session ID indicated by the UE 110 after the check integrity and decrypt data process 608. The SMF 604 sends RDS PDU to the NEF 106 or to a UPF.

Figure 7:
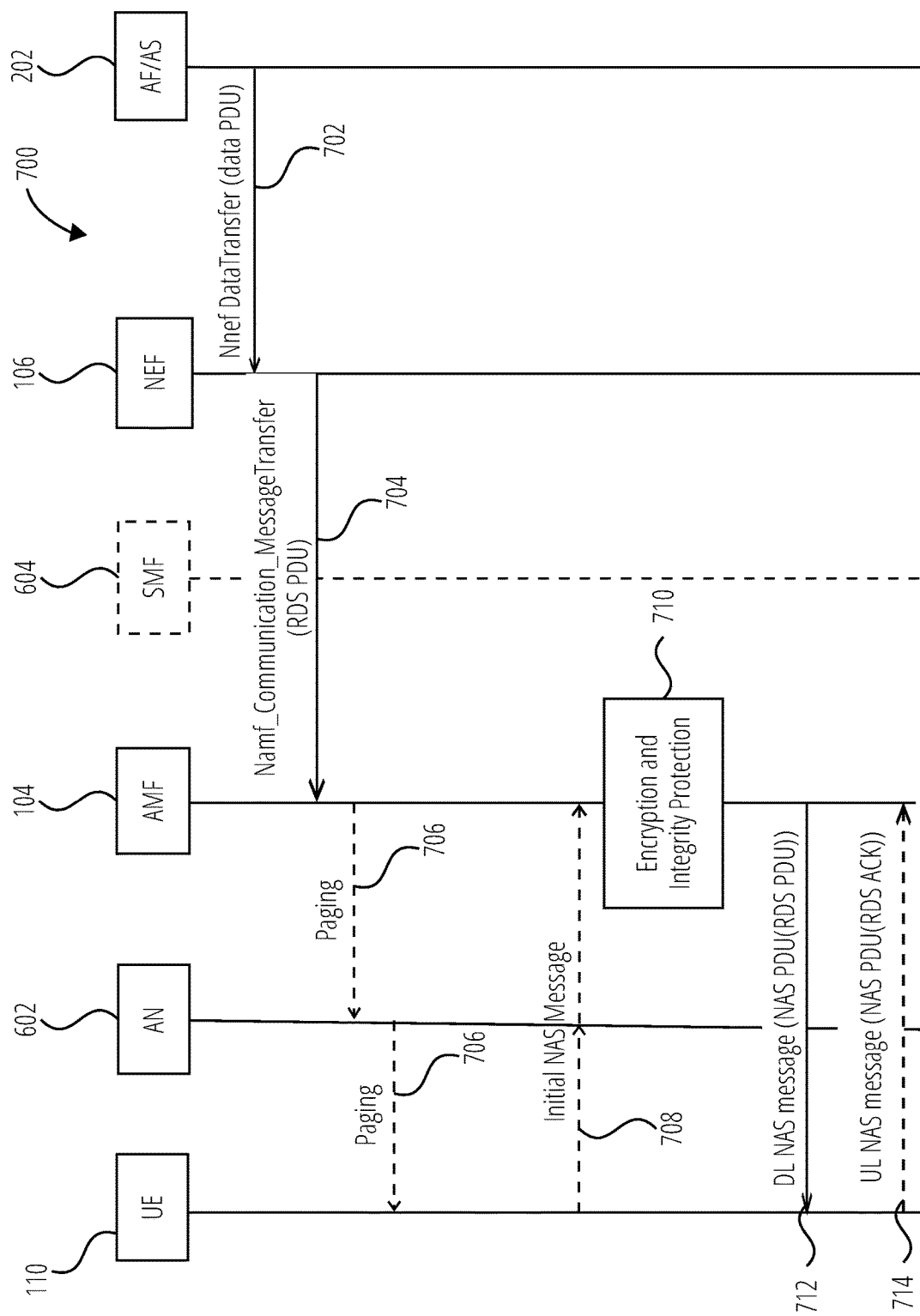
FIG. 7 illustrates an MT data delivery procedure in accordance with one embodiment.

FIG. 7 illustrates an MT data delivery procedure 700 in accordance with one embodiment. The MT data delivery procedure 700 may be used, for example, for MT reliable data delivery. In certain embodiments, the MT data delivery procedure 700 shown in FIG. 7 assumes that the AF/AS 202 has performed an RDS configuration procedure.

In certain embodiments, the AF/AS 202 requests reliable small data delivery using a Nnef DataTransfer service operation 702. The AF/AS 202 provides an External Identifier, DL data PDU, and Reliable Data configuration.

The NEF 106, based on UE context, determines UE identity from the UE's External identifier. The NEF 106 determines if the AF/AS 202 requested reliable small data delivery and adds RDS header to data PDU. The NEF 106 sends the RDS PDU to the AMF 104 using a Namf_Communication_MessageTransfer service operation 704.

If the UE 110 is in connection management (CM)-IDLE state, the AMF 104 buffers the RDS PDU and sends a paging message 706 to AN nodes. Then the UE 110 is paged by the AN nodes. The UE 110 responds to paging with an initial NAS message 708. If, on the other hand, the UE 110 is not in CM-IDLE state, the paging message 706 and initial NAS message 708 are skipped.

The AMF 104 performs an encryption and integrity protection process 710 to the RDS PDU.

The AMF 104 sends encrypted NAS PDU with RDS PDU to the AN 602 in a DL NAS message 712.

If RDS acknowledgment is requested (as indicated by RDS PDU header received in the DL NAS message 712), the UE 110 sends RDS ACK to the AMF 104. Then, the AMF 104 sends the RDS ACK to the NEF 106 and the NEF 106 sends it to the AF/AS 202 (as shown in FIG. 6 of the MO reliable small data delivery procedure).

The NAS messages shown in FIG. 7 are used as examples only. Actual names for NAS messages may differ or different NAS messages may be used for sending and receiving RDS PDU/ACK.

In certain embodiments, PDU session is established between the UE 110 and the NEF 106. In such embodiments, the following additional operations may be performed. The NEF 106 determines the PDU session ID corresponding to the UE identity from the UE context in the NEF 106. The NEF 106 routes DL RDS PDU to the SMF 604 for the PDU session ID. The SMF 604 sends RDS PDU to the AMF 104 as shown in the Namf_Communication_MessageTransfer service operation 704.

Figure 8:
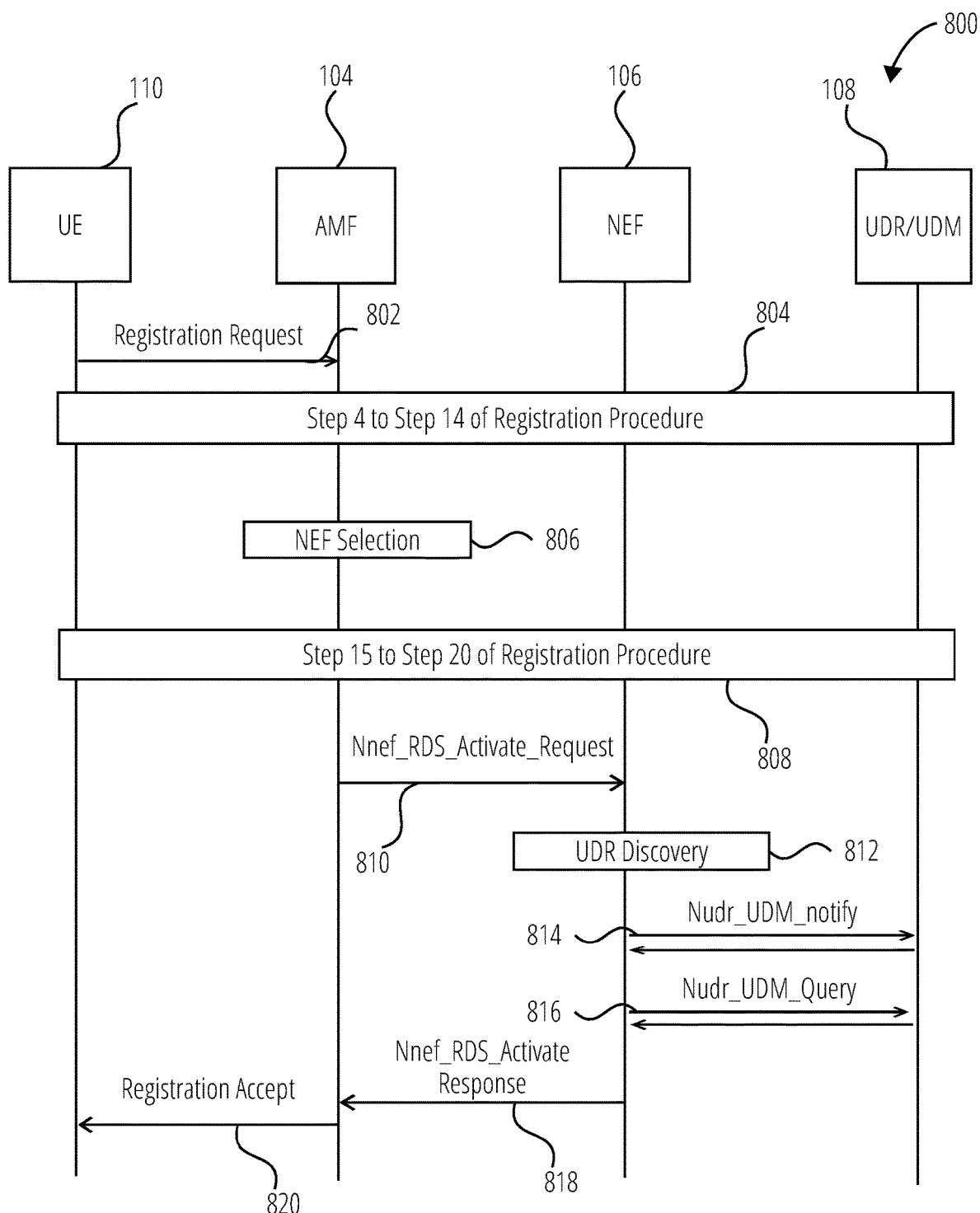
FIG. 8 illustrates a registration procedure supporting RDS delivery over NAS in accordance with one embodiment.

FIG. 8 illustrates a registration procedure 800 supporting RDS delivery over NAS in accordance with one embodiment. The illustrated registration procedure 800 is provided by way of example only. As discussed above, in other embodiments a UE may indicate its capability of supporting RDS in other ways, e.g., in the PCO. In the example shown in FIG. 8, the registration procedure 800 includes interactions and communications between a UE 110, an AMF 104, a NEF 106, and a UDR/UDM 108. During a registration procedure, such as the 5GS registration procedure defined in FIG. 4.2.2.2.2-1 of TS 23.502, to enable reliable small data delivery, the UE 110 includes an "RDS supported" indication in a Registration Request 802 in steps 1-3 of FIG. 4.2.2.2.2-1 of TS 23.502 indicating the UE's capability for RDS. The "RDS supported" indication indicates whether the UE 110 supports reliable small data delivery over NAS via current access.

Step 4 to step 14 of Registration Procedure 804 of FIG. 4.2.2.2.2-1 of TS 23.502 are performed. When the AMF 104 relocation happens during the registration procedure, the old AMF transfers NEF address to the new AMF 104 as part of UE context in step 5 of FIG. 4.2.2.2.2-1.

In a NEF Selection 806, if the "RDS supported" indication is included in the registration request, the AMF 104 checks subscription from the UDR/UDM 108 for the UE 110 on whether the RDS service is allowed to the UE 110. If yes and the UE context doesn't include an available NEF of the serving PLMN, the AMF 104 discovers and selects a NEF 106 to serve the UE 110. The NEF discovery is based on the following methods: NEF address preconfigured in the AMF 104 (i.e., NEF FQDN); or NEF address received from the UDR/UDM 108; or the AMF 104 invokes Nnrf_NFDiscovery service operation from NRF to discover the NEF address as described in clause 5.2.7.3.2 of TS 23.502. For roaming scenario, the AMF 104 discovers and selects a NEF in VPLMN.

Step 15 to step 20 of Registration Procedure 808 of FIG. 4.2.2.2.2-1 of TS 23.502 are performed.

The AMF 104 invokes a Nnef_RDS_Activate_Request 810 operation from the NEF 106. The invocation includes AMF address, access Type, GPSI (if available) and SUPI. The AMF 104 uses the NEF address derived from the NEF Selection 806.

The NEF 106 performs UDR discovery 812, as described in TS 23.501, clause 6.3.9.

If the UE context already exists in the NEF 106, the NEF 106 replaces the old AMF address with the new AMF address. Otherwise, the NEF 106 retrieves RDS related subscription data using Nudr_UDM_Query 816 and subscribes to be notified using Nudr_UDM_notify 814 when the RDS related subscription data is modified. The NEF 106 also creates a UE context to store the RDS subscription information and the AMF address that is serving this UE 110.

The NEF 106 responds back to the AMF 104 with Nsmsf_SMService_Activate service operation response message or Nnef_RDS_Activate Response 818. The AMF 104 stores the NEF address received as part of the UE context.

In certain embodiments, the AMF 104 includes the "RDS supported" indication to the UE 110 in the Registration Accept message of step 21 of FIG. 4.2.2.2.2-1 of TS 23.502 only after the Nnef_RDS_Activate Response 818 in which the AMF 104 has received a positive indication from the selected NEF 106. The "RDS supported" indication in the Registration Accept 820 message indicates to the UE 110 whether the network allows the reliable small message delivery over NAS via 3GPP access or via both the 3GPP and non-3GPP access.

Figure 9:
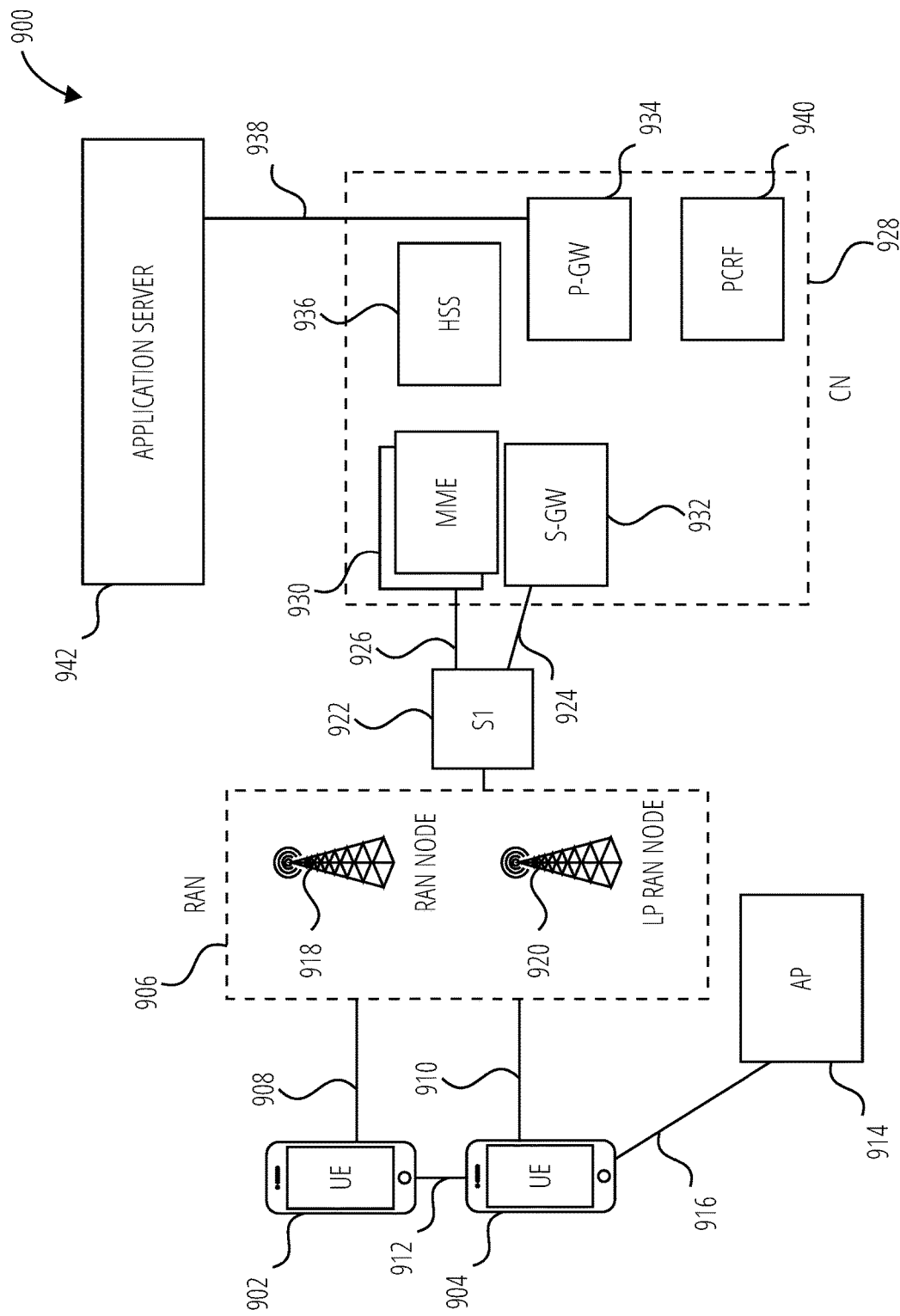
FIG. 9 illustrates a system in accordance with one embodiment.

FIG. 9 illustrates an architecture of a system 900 of a network in accordance with some embodiments. The system 900 includes one or more user equipment (UE), shown in this example as a UE 902 and a UE 904. The UE 902 and the UE 904 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 902 and the UE 904 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 902 and the UE 904 may be configured to connect, e.g., communicatively couple, with a radio access network (RAN), shown as RAN 906. The RAN 906 may be, for example, an Evolved Universal Mobile Telecommunications System (UMTS) Terrestrial Radio Access Network (E-UTRAN), a NextGen RAN (NG RAN), or some other type of RAN. The UE 902 and the UE 904 utilize connection 908 and connection 910, respectively, each of which comprises a physical communications interface or layer (discussed in further detail below); in this example, the connection 908 and the connection 910 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 902 and the UE 904 may further directly exchange communication data via a ProSe interface 912. The ProSe interface 912 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 904 is shown to be configured to access an access point (AP), shown as AP 914, via connection 916. The connection 916 can comprise a local wireless connection, such as a connection consistent with any IEEE 802.11 protocol, wherein the AP 914 would comprise a wireless fidelity (WiFi®) router. In this example, the AP 914 may be connected to the Internet without connecting to the core network of the wireless system (described in further detail below).

The RAN 906 can include one or more access nodes that enable the connection 908 and the connection 910. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 906 may include one or more RAN nodes for providing macrocells, e.g., macro RAN node 918, and one or more RAN nodes for providing femtocells or picocells (e.g., cells having smaller coverage areas, smaller user capacity, or higher bandwidth compared to macrocells), e.g., a low power (LP) RAN node such as LP RAN node 920.

Any of the macro RAN node 918 and the LP RAN node 920 can terminate the air interface protocol and can be the first point of contact for the UE 902 and the UE 904. In some embodiments, any of the macro RAN node 918 and the LP RAN node 920 can fulfill various logical functions for the RAN 906 including, but not limited to, radio network controller (RNC) functions such as radio bearer management, uplink and downlink dynamic radio resource management and data packet scheduling, and mobility management.

In accordance with some embodiments, the UE 902 and the UE 904 can be configured to communicate using Orthogonal Frequency-Division Multiplexing (OFDM) communication signals with each other or with any of the macro RAN node 918 and the LP RAN node 920 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 918 and the LP RAN node 920 to the UE 902 and the UE 904, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 902 and the UE 904. The physical downlink control channel (PDCCH) may carry information about the transport format and resource allocations related to the PDSCH channel, among other things. It may also inform the UE 902 and the UE 904 about the transport format, resource allocation, and H-ARQ (Hybrid Automatic Repeat Request) information related to the uplink shared channel. Typically, downlink scheduling (assigning control and shared channel resource blocks to the UE 904 within a cell) may be performed at any of the macro RAN node 918 and the LP RAN node 920 based on channel quality information fed back from any of the UE 902 and UE 904. The downlink resource assignment information may be sent on the PDCCH used for (e.g., assigned to) each of the UE 902 and the UE 904.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 906 is communicatively coupled to a core network (CN), shown as CN 928, via an S1 interface 922. In embodiments, the CN 928 may be an evolved packet core (EPC) network, a NextGen Packet Core (NPC) network, or some other type of CN. In this embodiment the S1 interface 922 is split into two parts: the S1-U interface 924, which carries traffic data between the macro RAN node 918 and the LP RAN node 920 and a serving gateway (S-GW), shown as S-GW 932, and an S1-mobility management entity (MME) interface, shown as S1-MME interface 926, which is a signaling interface between the macro RAN node 918 and LP RAN node 920 and the MME(s) 930.

In this embodiment, the CN 928 comprises the MME(s) 930, the S-GW 932, a Packet Data Network (PDN) Gateway (P-GW) (shown as P-GW 934), and a home subscriber server (HSS) (shown as HSS 936). The MME(s) 930 may be similar in function to the control plane of legacy Serving General Packet Radio Service (GPRS) Support Nodes (SGSN). The MME(s) 930 may manage mobility aspects in access such as gateway selection and tracking area list management. The HSS 936 may comprise a database for network users, including subscription-related information to support the network entities' handling of communication sessions. The CN 928 may comprise one or several HSS 936, depending on the number of mobile subscribers, on the capacity of the equipment, on the organization of the network, etc. For example, the HSS 936 can provide support for routing/roaming, authentication, authorization, naming/addressing resolution, location dependencies, etc.

The S-GW 932 may terminate the S1 interface 322 towards the RAN 906, and routes data packets between the RAN 906 and the CN 928. In addition, the S-GW 932 may be a local mobility anchor point for inter-RAN node handovers and also may provide an anchor for inter-3GPP mobility. Other responsibilities may include lawful intercept, charging, and some policy enforcement.

The P-GW 934 may terminate an SGi interface toward a PDN. The P-GW 934 may route data packets between the CN 928 (e.g., an EPC network) and external networks such as a network including the application server 942 (alternatively referred to as application function (AF)) via an Internet Protocol (IP) interface (shown as IP communications interface 938). Generally, an application server 942 may be an element offering applications that use IP bearer resources with the core network (e.g., UMTS Packet Services (PS) domain, LTE PS data services, etc.). In this embodiment, the P-GW 934 is shown to be communicatively coupled to an application server 942 via an IP communications interface 938. The application server 942 can also be configured to support one or more communication services (e.g., Voice-over-Internet Protocol (VoIP) sessions, PTT sessions, group communication sessions, social networking services, etc.) for the UE 902 and the UE 904 via the CN 928.

The P-GW 934 may further be a node for policy enforcement and charging data collection. A Policy and Charging Enforcement Function (PCRF) (shown as PCRF 940) is the policy and charging control element of the CN 928. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 940 may be communicatively coupled to the application server 942 via the P-GW 934. The application server 942 may signal the PCRF 940 to indicate a new service flow and select the appropriate Quality of Service (QoS) and charging parameters. The PCRF 940 may provision this rule into a Policy and Charging Enforcement Function (PCEF) (not shown) with the appropriate traffic flow template (TFT) and QoS class of identifier (QCI), which commences the QoS and charging as specified by the application server 942.

Figure 10:
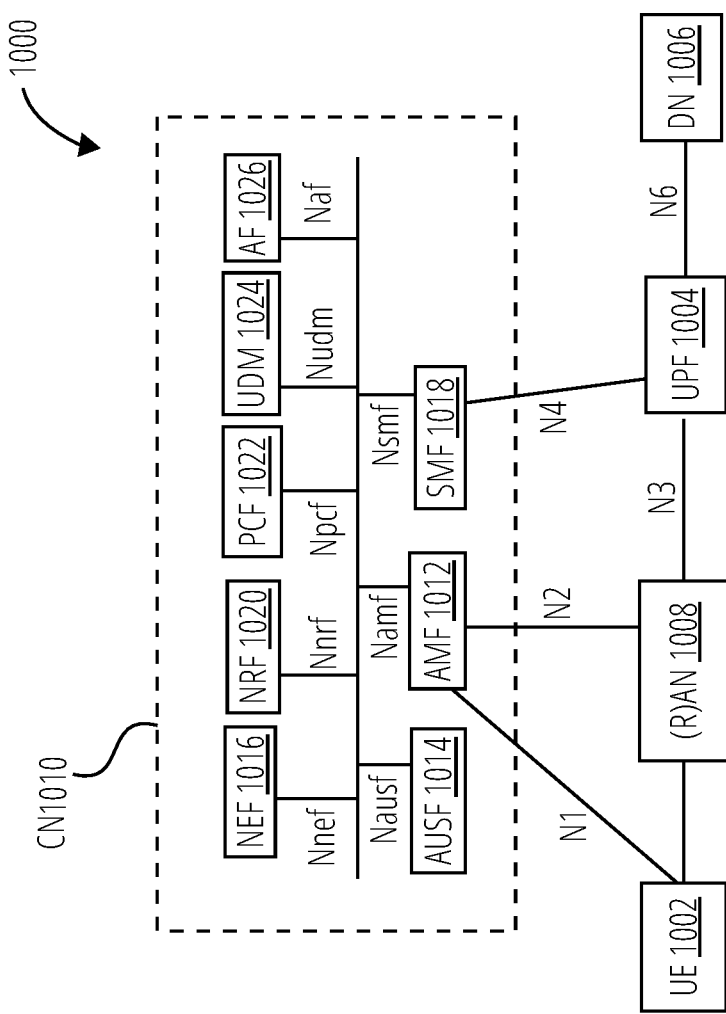
FIG. 10 illustrates a system in accordance with one embodiment.

FIG. 10 illustrates an architecture of a system 1000 of a network in accordance with some embodiments. The system 1000 is shown to include a UE 1002, which may be the same or similar to the UE 902 and the UE 904 discussed previously; a 5G access node or RAN node (shown as (R)AN node 1008), which may be the same or similar to the macro RAN node 918 and/or the LP RAN node 920 discussed previously; a User Plane Function (shown as UPF 1004); a Data Network (DN 1006), which may be, for example, operator services, Internet access or 3rd party services; and a 5G Core Network (5GC) (shown as CN 1010).

The CN 1010 may include an Authentication Server Function (AUSF 1014); a Core Access and Mobility Management Function (AMF 1012); a Session Management Function (SMF 1018); a Network Exposure Function (NEF 1016); a Policy Control Function (PCF 1022); a Network Function (NF) Repository Function (NRF 1020); a Unified Data Management (UDM 1024); and an Application Function (AF 1026). The CN 1010 may also include other elements that are not shown, such as a Structured Data Storage network function (SDSF), an Unstructured Data Storage network function (UDSF), and the like.

The UPF 1004 may act as an anchor point for intra-RAT and inter-RAT mobility, an external PDU session point of interconnect to DN 1006, and a branching point to support multi-homed PDU session. The UPF 1004 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1004 may include an uplink classifier to support routing traffic flows to a data network. The DN 1006 may represent various network operator services, Internet access, or third party services. DN 1006 may include, or be similar to the application server 942 discussed previously.

The AUSF 1014 may store data for authentication of UE 1002 and handle authentication related functionality. The AUSF 1014 may facilitate a common authentication framework for various access types.

The AMF 1012 may be responsible for registration management (e.g., for registering UE 1002, etc.), connection management, reachability management, mobility management, and lawful interception of AMF-related events, and access authentication and authorization. AMF 1012 may provide transport for SM messages for the SMF 1018, and act as a transparent proxy for routing SM messages. AMF 1012 may also provide transport for short message service (SMS) messages between UE 1002 and an SMS function (SMSF) (not shown by FIG. 10). AMF 1012 may act as Security Anchor Function (SEA), which may include interaction with the AUSF 1014 and the UE 1002, receipt of an intermediate key that was established as a result of the UE 1002 authentication process. Where USIM based authentication is used, the AMF 1012 may retrieve the security material from the AUSF 1014. AMF 1012 may also include a Security Context Management (SCM) function, which receives a key from the SEA that it uses to derive access-network specific keys. Furthermore, AMF 1012 may be a termination point of RAN CP interface (N2 reference point), a termination point of NAS (NI) signaling, and perform NAS ciphering and integrity protection.

AMF 1012 may also support NAS signaling with a UE 1002 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 1002 and AMF 1012, and relay uplink and downlink user-plane packets between the UE 1002 and UPF 1004. The N3IWF also provides mechanisms for IPsec tunnel establishment with the UE 1002.

The SMF 1018 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 1018 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 1016 may provide means for securely exposing the services and capabilities provided by 3GPP network functions for third party, internal exposure/re-exposure, Application Functions (e.g., AF 1026), edge computing or fog computing systems, etc. In such embodiments, the NEF 1016 may authenticate, authorize, and/or throttle the AFs. NEF 1016 may also translate information exchanged with the AF 1026 and information exchanged with internal network functions. For example, the NEF 1016 may translate between an AF-Service-Identifier and an internal 5GC information. NEF 1016 may also receive information from other network functions (NFs) based on exposed capabilities of other network functions. This information may be stored at the NEF 1016 as structured data, or at a data storage NF using a standardized interfaces. The stored information can then be re-exposed by the NEF 1016 to other NFs and AFs, and/or used for other purposes such as analytics.

The NRF 1020 may support service discovery functions, receive NF Discovery Requests from NF instances, and provide the information of the discovered NF instances to the NF instances. NRF 1020 also maintains information of available NF instances and their supported services.

The PCF 1022 may provide policy rules to control plane function(s) to enforce them, and may also support unified policy framework to govern network behavior. The PCF 1022 may also implement a front end (FE) to access subscription information relevant for policy decisions in a UDR of UDM 1024.

The UDM 1024 may handle subscription-related information to support the network entities' handling of communication sessions, and may store subscription data of UE 1002. The UDM 1024 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 1022. UDM 1024 may also support SMS management, wherein an SMS-FE implements the similar application logic as discussed previously.

The AF 1026 may provide application influence on traffic routing, access to the Network Capability Exposure (NCE), and interact with the policy framework for policy control. The NCE may be a mechanism that allows the 5GC and AF 1026 to provide information to each other via NEF 1016, which may be used for edge computing implementations. In such implementations, the network operator and third party services may be hosted close to the UE 1002 access point of attachment to achieve an efficient service delivery through the reduced end-to-end latency and load on the transport network. For edge computing implementations, the 5GC may select a UPF 1004 close to the UE 1002 and execute traffic steering from the UPF 1004 to DN 1006 via the N6 interface. This may be based on the UE subscription data, UE location, and information provided by the AF 1026. In this way, the AF 1026 may influence UPF (re)selection and traffic routing. Based on operator deployment, when AF 1026 is considered to be a trusted entity, the network operator may permit AF 1026 to interact directly with relevant NFs.

As discussed previously, the CN 1010 may include an SMSF, which may be responsible for SMS subscription checking and verification, and relaying SM messages to/from the UE 1002 to/from other entities, such as an SMS-GMSC/IWMSC/SMS-router. The SMS may also interact with AMF 1012 and UDM 1024 for notification procedure that the UE 1002 is available for SMS transfer (e.g., set a UE not reachable flag, and notifying UDM 1024 when UE 1002 is available for SMS).

The system 1000 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 1000 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 1010 may include an Nx interface, which is an inter-CN interface between the MME (e.g., MME(s) 930) and the AMF 1012 in order to enable interworking between CN 1010 and CN 928.

Although not shown by FIG. 10, the system 1000 may include multiple RAN nodes (such as (R)AN node 1008) wherein an Xn interface is defined between two or more (R)AN node 1008 (e.g., gNBs and the like) that connecting to 5GC 410, between a (R)AN node 1008 (e.g., gNB) connecting to CN 1010 and an eNB (e.g., a macro RAN node 918 of FIG. 9), and/or between two eNBs connecting to CN 1010.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1002 in a connected mode (e.g., CM-CONNECTED) including functionality to manage the UE mobility for connected mode between one or more (R)AN node 1008. The mobility support may include context transfer from an old (source) serving (R)AN node 1008 to new (target) serving (R)AN node 1008; and control of user plane tunnels between old (source) serving (R)AN node 1008 to new (target) serving (R)AN node 1008.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 11:
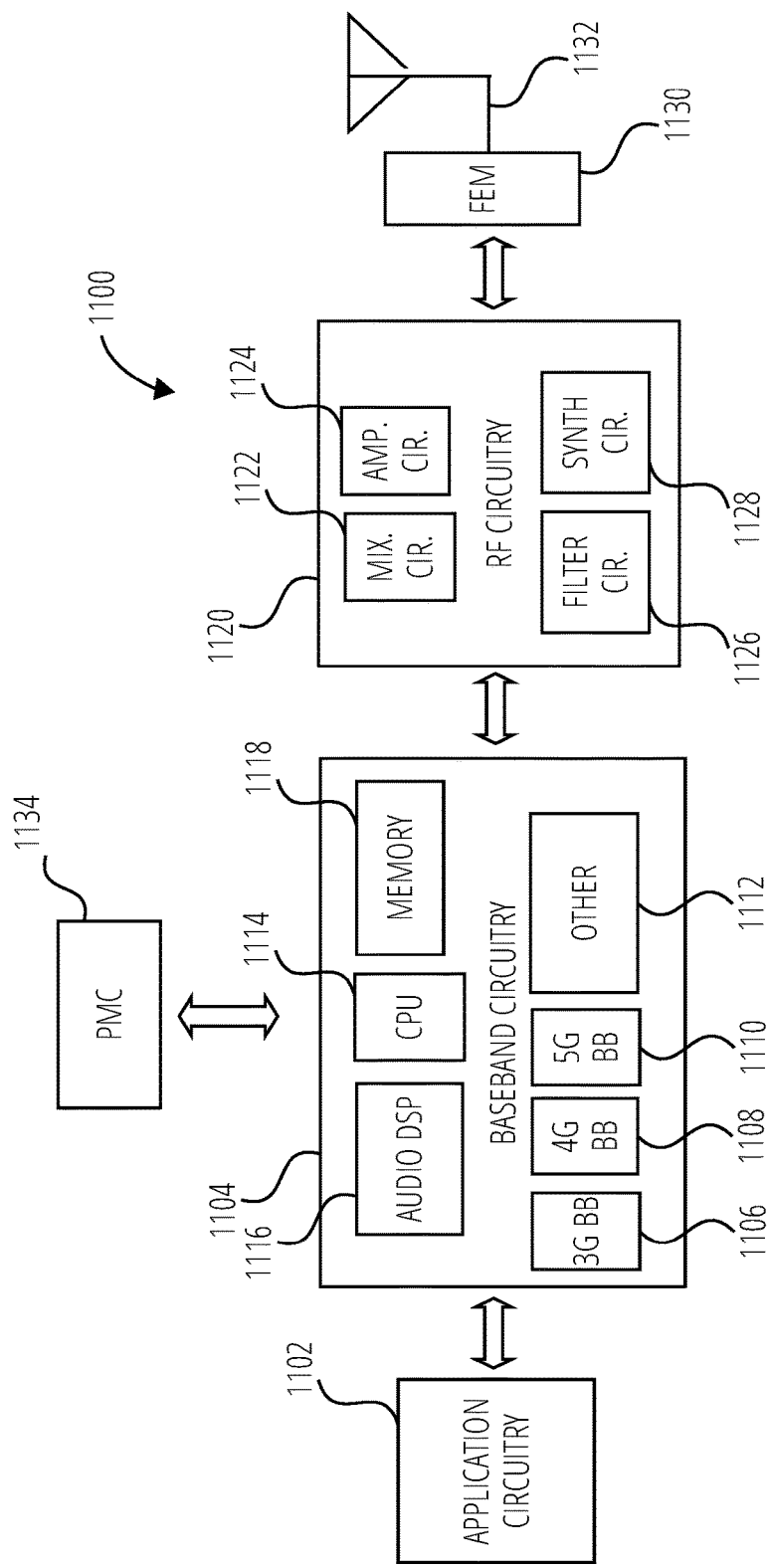
FIG. 11 illustrates a device in accordance with one embodiment.

FIG. 11 illustrates example components of a device 1100 in accordance with some embodiments. In some embodiments, the device 1100 may include application circuitry 1102, baseband circuitry 1104, Radio Frequency (RF) circuitry (shown as RF circuitry 1120), front-end module (FEM) circuitry (shown as FEM circuitry 1130), one or more antennas 1132, and power management circuitry (PMC) (shown as PMC 1134) coupled together at least as shown. The components of the illustrated device 1100 may be included in a UE or a RAN node. In some embodiments, the device 1100 may include fewer elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1120 and to generate baseband signals for a transmit signal path of the RF circuitry 1120. The baseband circuitry 1104 may interface with the application circuitry 1102 for generation and processing of the baseband signals and for controlling operations of the RF circuitry 1120. For example, in some embodiments, the baseband circuitry 1104 may include a third generation (3G) baseband processor (3G baseband processor 1106), a fourth generation (4G) baseband processor (4G baseband processor 1108), a fifth generation (5G) baseband processor (5G baseband processor 1110), or other baseband processor(s) 1112 for other existing generations, generations in development or to be developed in the future (e.g., second generation (2G), sixth generation (6G), etc.). The baseband circuitry 1104 (e.g., one or more of baseband processors) may handle various radio control functions that enable communication with one or more radio networks via the RF circuitry 1120. In other embodiments, some or all of the functionality of the illustrated baseband processors may be included in modules stored in the memory 1118 and executed via a Central Processing Unit (CPU 1114). The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include a digital signal processor (DSP), such as one or more audio DSP(s) 1116. The one or more audio DSP(s) 1116 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1120 may enable communication with wireless networks using modulated electromagnetic radiation through a non-solid medium. In various embodiments, the RF circuitry 1120 may include switches, filters, amplifiers, etc. to facilitate the communication with the wireless network. The RF circuitry 1120 may include a receive signal path which may include circuitry to down-convert RF signals received from the FEM circuitry 1130 and provide baseband signals to the baseband circuitry 1104. The RF circuitry 1120 may also include a transmit signal path which may include circuitry to up-convert baseband signals provided by the baseband circuitry 1104 and provide RF output signals to the FEM circuitry 1130 for transmission.

In some embodiments, the receive signal path of the RF circuitry 1120 may include mixer circuitry 1122, amplifier circuitry 1124 and filter circuitry 1126. In some embodiments, the transmit signal path of the RF circuitry 1120 may include filter circuitry 1126 and mixer circuitry 1122. The RF circuitry 1120 may also include synthesizer circuitry 1128 for synthesizing a frequency for use by the mixer circuitry 1122 of the receive signal path and the transmit signal path. In some embodiments, the mixer circuitry 1122 of the receive signal path may be configured to down-convert RF signals received from the FEM circuitry 1130 based on the synthesized frequency provided by synthesizer circuitry 1128. The amplifier circuitry 1124 may be configured to amplify the down-converted signals and the filter circuitry 1126 may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1122 of the receive signal path may comprise passive mixers, although the scope of the embodiments is not limited in this respect.

In some embodiments, the mixer circuitry 1122 of the transmit signal path may be configured to up-convert input baseband signals based on the synthesized frequency provided by the synthesizer circuitry 1128 to generate RF output signals for the FEM circuitry 1130. The baseband signals may be provided by the baseband circuitry 1104 and may be filtered by the filter circuitry 1126.

In some embodiments, the mixer circuitry 1122 of the receive signal path and the mixer circuitry 1122 of the transmit signal path may include two or more mixers and may be arranged for quadrature downconversion and upconversion, respectively. In some embodiments, the mixer circuitry 1122 of the receive signal path and the mixer circuitry 1122 of the transmit signal path may include two or more mixers and may be arranged for image rejection (e.g., Hartley image rejection). In some embodiments, the mixer circuitry 1122 of the receive signal path and the mixer circuitry 1122 may be arranged for direct downconversion and direct upconversion, respectively. In some embodiments, the mixer circuitry 1122 of the receive signal path and the mixer circuitry 1122 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1120 may include analog-to-digital converter (ADC) and digital-to-analog converter (DAC) circuitry and the baseband circuitry 1104 may include a digital baseband interface to communicate with the RF circuitry 1120.

In some dual-mode embodiments, a separate radio IC circuitry may be provided for processing signals for each spectrum, although the scope of the embodiments is not limited in this respect.

In some embodiments, the synthesizer circuitry 1128 may be a fractional-N synthesizer or a fractional N/N+1 synthesizer, although the scope of the embodiments is not limited in this respect as other types of frequency synthesizers may be suitable. For example, synthesizer circuitry 1128 may be a delta-sigma synthesizer, a frequency multiplier, or a synthesizer comprising a phase-locked loop with a frequency divider.

The synthesizer circuitry 1128 may be configured to synthesize an output frequency for use by the mixer circuitry 1122 of the RF circuitry 1120 based on a frequency input and a divider control input. In some embodiments, the synthesizer circuitry 1128 may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1102 (such as an applications processor) depending on the desired output frequency. In some embodiments, a divider control input (e.g., N) may be determined from a look-up table based on a channel indicated by the application circuitry 1102.

Synthesizer circuitry 1128 of the RF circuitry 1120 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1128 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1120 may include an IQ/polar converter.

The FEM circuitry 1130 may include a receive signal path which may include circuitry configured to operate on RF signals received from one or more antennas 1132, amplify the received signals and provide the amplified versions of the received signals to the RF circuitry 1120 for further processing. The FEM circuitry 1130 may also include a transmit signal path which may include circuitry configured to amplify signals for transmission provided by the RF circuitry 1120 for transmission by one or more of the one or more antennas 1132. In various embodiments, the amplification through the transmit or receive signal paths may be done solely in the RF circuitry 1120, solely in the FEM circuitry 1130, or in both the RF circuitry 1120 and the FEM circuitry 1130.

In some embodiments, the FEM circuitry 1130 may include a TX/RX switch to switch between transmit mode and receive mode operation. The FEM circuitry 1130 may include a receive signal path and a transmit signal path. The receive signal path of the FEM circuitry 1130 may include an LNA to amplify received RF signals and provide the amplified received RF signals as an output (e.g., to the RF circuitry 1120). The transmit signal path of the FEM circuitry 1130 may include a power amplifier (PA) to amplify input RF signals (e.g., provided by the RF circuitry 1120), and one or more filters to generate RF signals for subsequent transmission (e.g., by one or more of the one or more antennas 1132).

In some embodiments, the PMC 1134 may manage power provided to the baseband circuitry 1104. In particular, the PMC 1134 may control power-source selection, voltage scaling, battery charging, or DC-to-DC conversion. The PMC 1134 may often be included when the device 1100 is capable of being powered by a battery, for example, when the device 1100 is included in a UE. The PMC 1134 may increase the power conversion efficiency while providing desirable implementation size and heat dissipation characteristics.

FIG. 11 shows the PMC 1134 coupled only with the baseband circuitry 1104. However, in other embodiments, the PMC 1134 may be additionally or alternatively coupled with, and perform similar power management operations for, other components such as, but not limited to, the application circuitry 1102, the RF circuitry 1120, or the FEM circuitry 1130.

In some embodiments, the PMC 1134 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used to execute Layer 3, Layer 2, or Layer 1 functionality, while processors of the application circuitry 1102 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
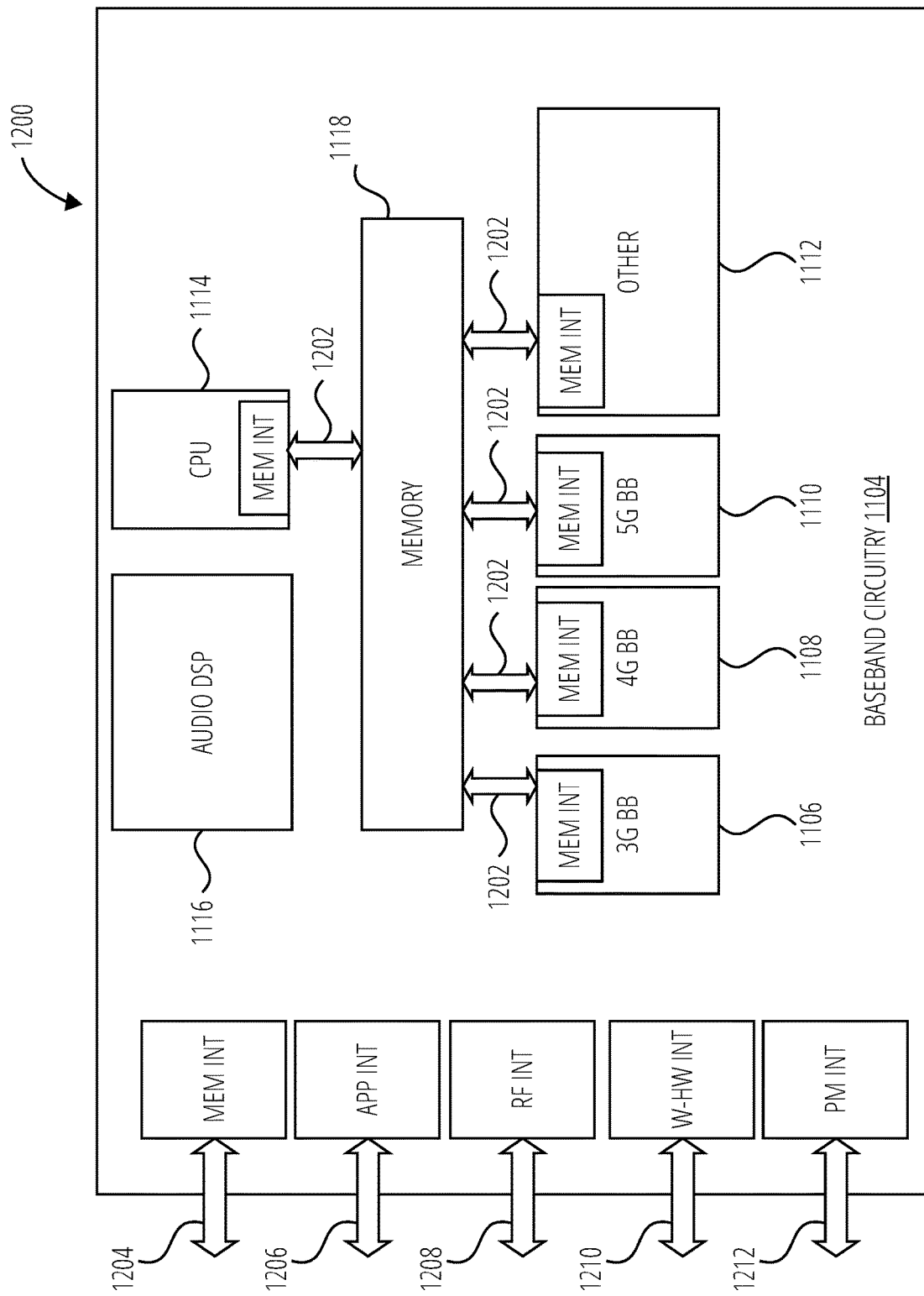
FIG. 12 illustrates an example interfaces in accordance with one embodiment.

FIG. 12 illustrates example interfaces 1200 of baseband circuitry in accordance with some embodiments. As discussed above, the baseband circuitry 1104 of FIG. 11 may comprise 3G baseband processor 1106, 4G baseband processor 1108, 5G baseband processor 1110, other baseband processor(s) 1112, CPU 1114, and a memory 1118 utilized by said processors. As illustrated, each of the processors may include a respective memory interface 1202 to send/receive data to/from the memory 1118.

The baseband circuitry 1104 may further include one or more interfaces to communicatively couple to other circuitries/devices, such as a memory interface 1204 (e.g., an interface to send/receive data to/from memory external to the baseband circuitry 1104), an application circuitry interface 1206 (e.g., an interface to send/receive data to/from the application circuitry 1102 of FIG. 11), an RF circuitry interface 1208 (e.g., an interface to send/receive data to/from RF circuitry 1120 of FIG. 11), a wireless hardware connectivity interface 1210 (e.g., an interface to send/receive data to/from Near Field Communication (NFC) components, Bluetooth® components (e.g., Bluetooth® Low Energy), Wi-Fi® components, and other communication components), and a power management interface 1212 (e.g., an interface to send/receive power or control signals to/from the PMC 1134.

Figure 13:
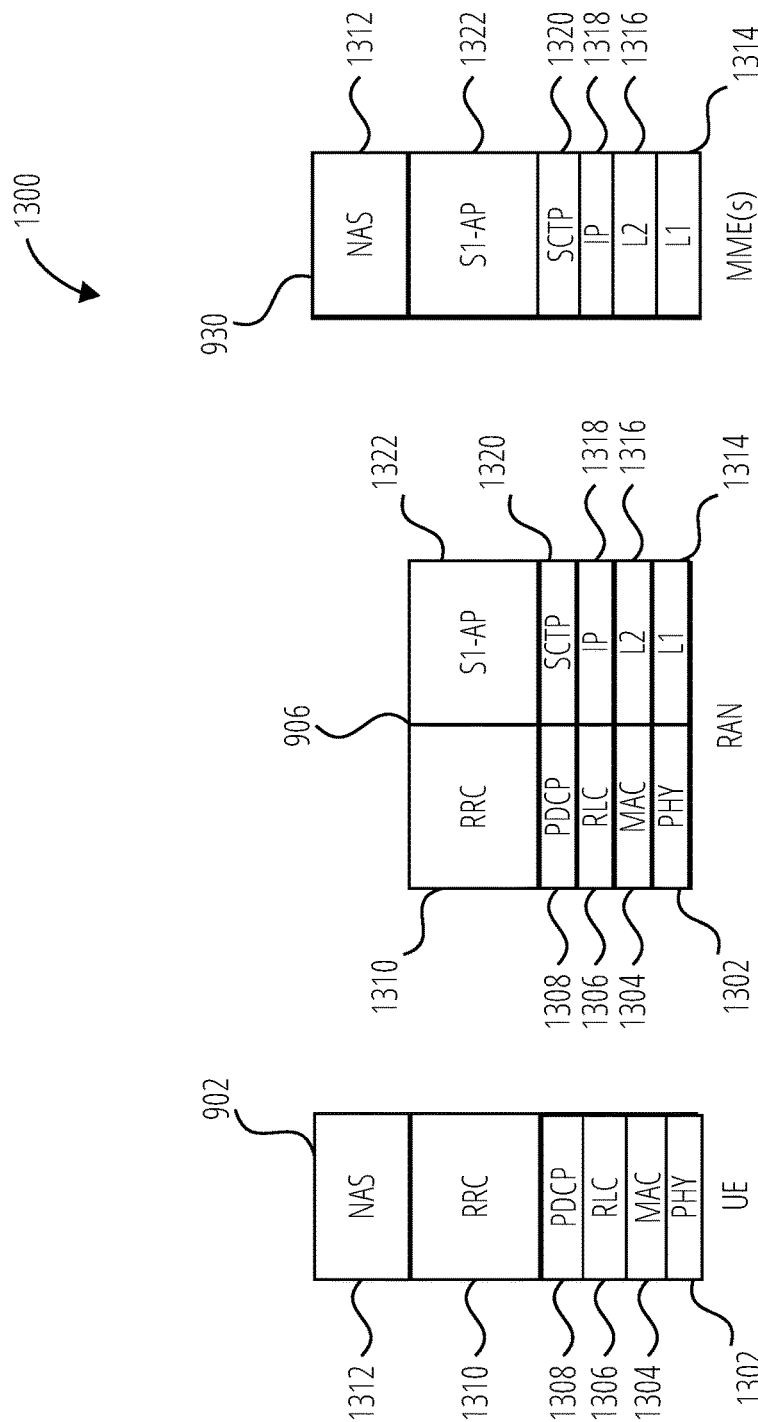
FIG. 13 illustrates a control plane in accordance with one embodiment.

FIG. 13 is an illustration of a control plane protocol stack in accordance with some embodiments. In this embodiment, a control plane 1300 is shown as a communications protocol stack between the UE 902 (or alternatively, the UE 904), the RAN 906 (e.g., the macro RAN node 918 and/or the LP RAN node 920), and the MME(s) 930.

A PHY layer 1302 may transmit or receive information used by the MAC layer 1304 over one or more air interfaces. The PHY layer 1302 may further perform link adaptation or adaptive modulation and coding (AMC), power control, cell search (e.g., for initial synchronization and handover purposes), and other measurements used by higher layers, such as an RRC layer 1310. The PHY layer 1302 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1304 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 1306 may operate in a plurality of modes of operation, including: Transparent Mode (TM), Unacknowledged Mode (UM), and Acknowledged Mode (AM). The RLC layer 1306 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1306 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1308 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1310 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 902 and the RAN 906 may utilize a Uu interface (e.g., an LTE-Uu interface) to exchange control plane data via a protocol stack comprising the PHY layer 1302, the MAC layer 1304, the RLC layer 1306, the PDCP layer 1308, and the RRC layer 1310.

In the embodiment shown, the non-access stratum (NAS) protocols (NAS protocols 1312) form the highest stratum of the control plane between the UE 902 and the MME(s) 930. The NAS protocols 1312 support the mobility of the UE 902 and the session management procedures to establish and maintain IP connectivity between the UE 902 and the P-GW 934.

The S1 Application Protocol (S1-AP) layer (S1-AP layer 1322) may support the functions of the S1 interface and comprise Elementary Procedures (EPs). An EP is a unit of interaction between the RAN 906 and the CN 928. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) (SCTP layer 1320) may ensure reliable delivery of signaling messages between the RAN 906 and the MME(s) 930 based, in part, on the IP protocol, supported by an IP layer 1318. An L2 layer 1316 and an L1 layer 1314 may refer to communication links (e.g., wired or wireless) used by the RAN node and the MME to exchange information.

The RAN 906 and the MME(s) 930 may utilize an S1-MME interface to exchange control plane data via a protocol stack comprising the L1 layer 1314, the L2 layer 1316, the IP layer 1318, the SCTP layer 1320, and the S1-AP layer 1322.

Figure 14:
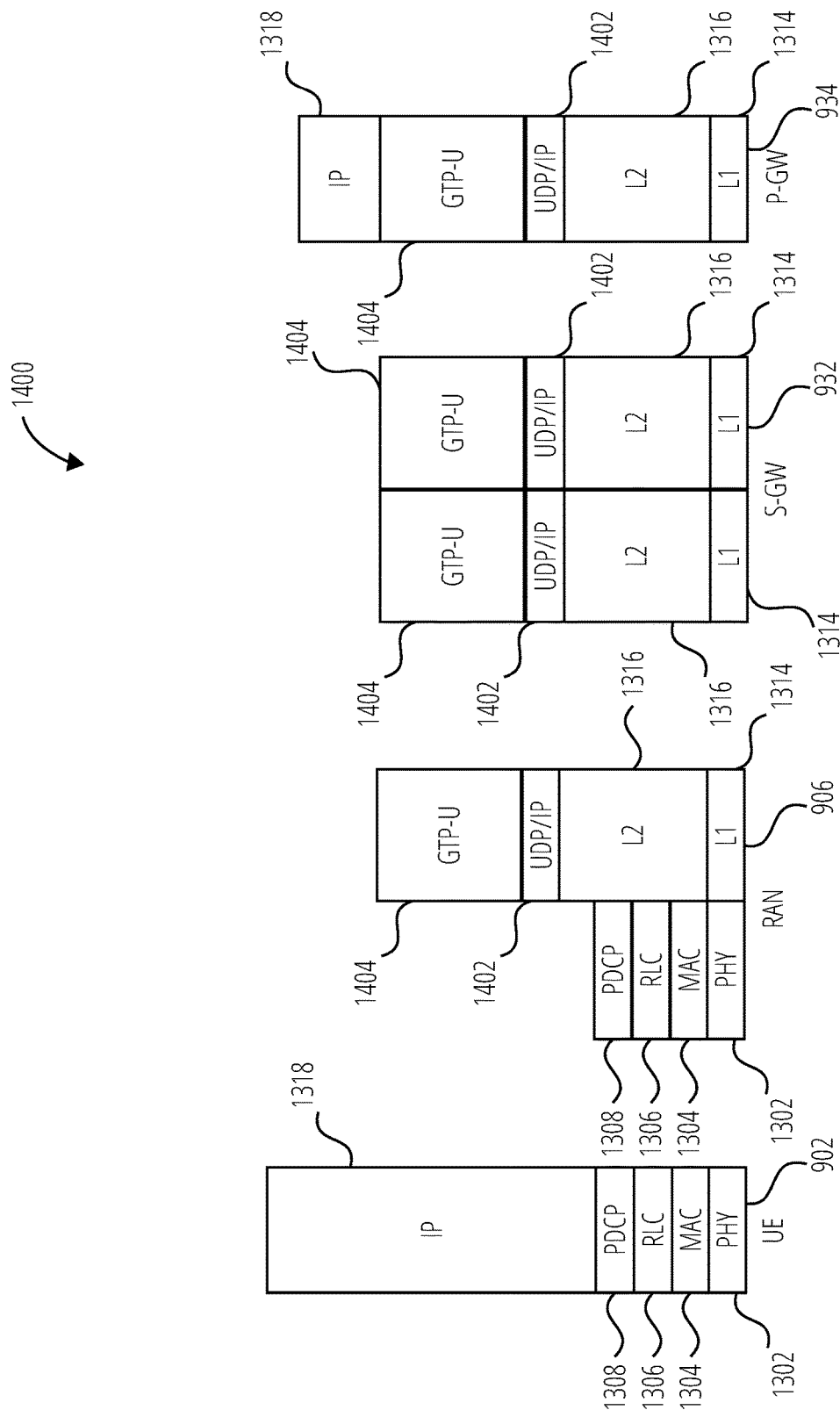
FIG. 14 illustrates a user plane in accordance with one embodiment.

FIG. 14 is an illustration of a user plane protocol stack in accordance with some embodiments. In this embodiment, a user plane 1400 is shown as a communications protocol stack between the UE 902 (or alternatively, the UE 904), the RAN 906 (e.g., the macro RAN node 918 and/or the LP RAN node 920), the S-GW 932, and the P-GW 934. The user plane 1400 may utilize at least some of the same protocol layers as the control plane 1300. For example, the UE 902 and the RAN 906 may utilize a Uu interface (e.g., an LTE-Uu interface) to exchange user plane data via a protocol stack comprising the PHY layer 1302, the MAC layer 1304, the RLC layer 1306, the PDCP layer 1308.

The General Packet Radio Service (GPRS) Tunneling Protocol for the user plane (GTP-U) layer (GTP-U layer 1404) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 1402) may provide checksums for data integrity, port numbers for addressing different functions at the source and destination, and encryption and authentication on the selected data flows. The RAN 906 and the S-GW 932 may utilize an S1-U interface to exchange user plane data via a protocol stack comprising the L1 layer 1314, the L2 layer 1316, the UDP/IP layer 1402, and the GTP-U layer 1404. The S-GW 932 and the P-GW 934 may utilize an S5/S8a interface to exchange user plane data via a protocol stack comprising the L1 layer 1314, the L2 layer 1316, the UDP/IP layer 1402, and the GTP-U layer 1404. As discussed above with respect to FIG. 13, NAS protocols support the mobility of the UE 902 and the session management procedures to establish and maintain IP connectivity between the UE 902 and the P-GW 934.

Figure 15:
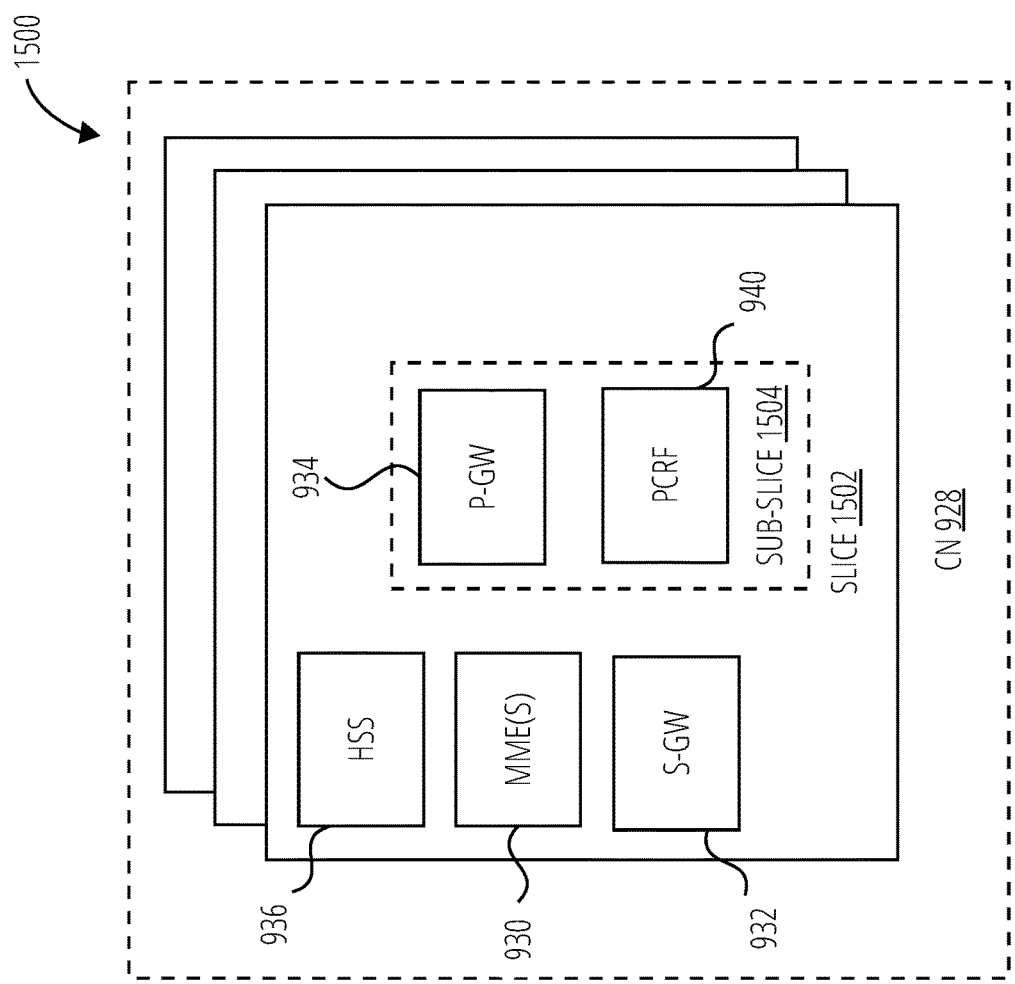
FIG. 15 illustrates components in accordance with one embodiment.

FIG. 15 illustrates components 1500 of a core network in accordance with some embodiments. The components of the CN 928 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 928 may be referred to as a network slice 1502 (e.g., the network slice 1502 is shown to include the HSS 936, the MME(s) 930, and the S-GW 932). A logical instantiation of a portion of the CN 928 may be referred to as a network sub-slice 1504 (e.g., the network sub-slice 1504 is shown to include the P-GW 934 and the PCRF 940).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 16:
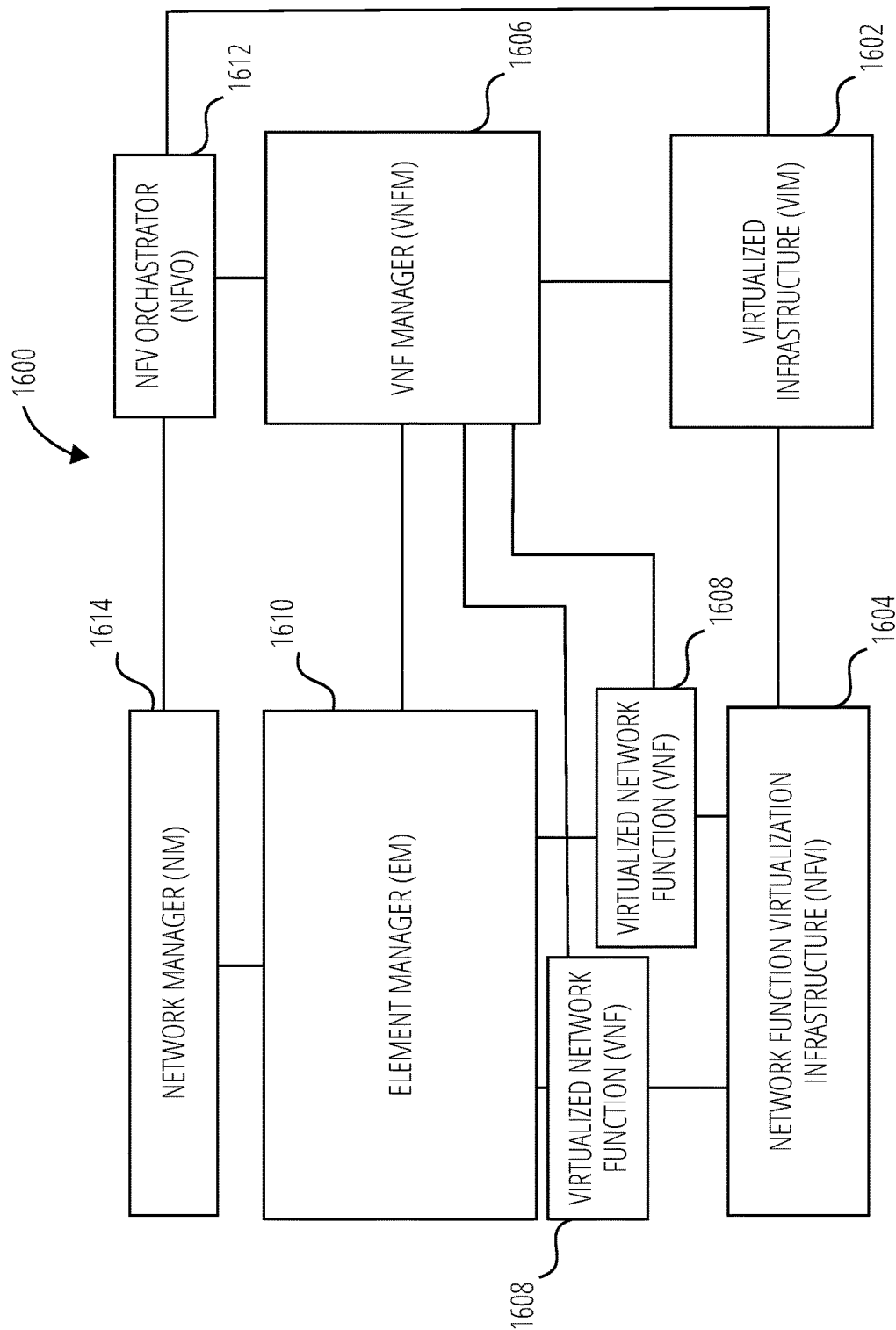
FIG. 16 illustrates a system in accordance with one embodiment.

FIG. 16 is a block diagram illustrating components, according to some example embodiments, of a system 1600 to support NFV. The system 1600 is illustrated as including a virtualized infrastructure manager (shown as VIM 1602), a network function virtualization infrastructure (shown as NFVI 1604), a VNF manager (shown as VNFM 1606), virtualized network functions (shown as VNF 1608), an element manager (shown as EM 1610), an NFV Orchestrator (shown as NFVO 1612), and a network manager (shown as NM 1614).

The VIM 1602 manages the resources of the NFVI 1604. The NFVI 1604 can include physical or virtual resources and applications (including hypervisors) used to execute the system 1600. The VIM 1602 may manage the life cycle of virtual resources with the NFVI 1604 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1606 may manage the VNF 1608. The VNF 1608 may be used to execute EPC components/functions. The VNFM 1606 may manage the life cycle of the VNF 1608 and track performance, fault and security of the virtual aspects of VNF 1608. The EM 1610 may track the performance, fault and security of the functional aspects of VNF 1608. The tracking data from the VNFM 1606 and the EM 1610 may comprise, for example, performance measurement (PM) data used by the VIM 1602 or the NFVI 1604. Both the VNFM 1606 and the EM 1610 can scale up/down the quantity of VNFs of the system 1600.

The NFVO 1612 may coordinate, authorize, release and engage resources of the NFVI 1604 in order to provide the requested service (e.g., to execute an EPC function, component, or slice). The NM 1614 may provide a package of end-user functions with the responsibility for the management of a network, which may include network elements with VNFs, non-virtualized network functions, or both (management of the VNFs may occur via the EM 1610).

Figure 17:
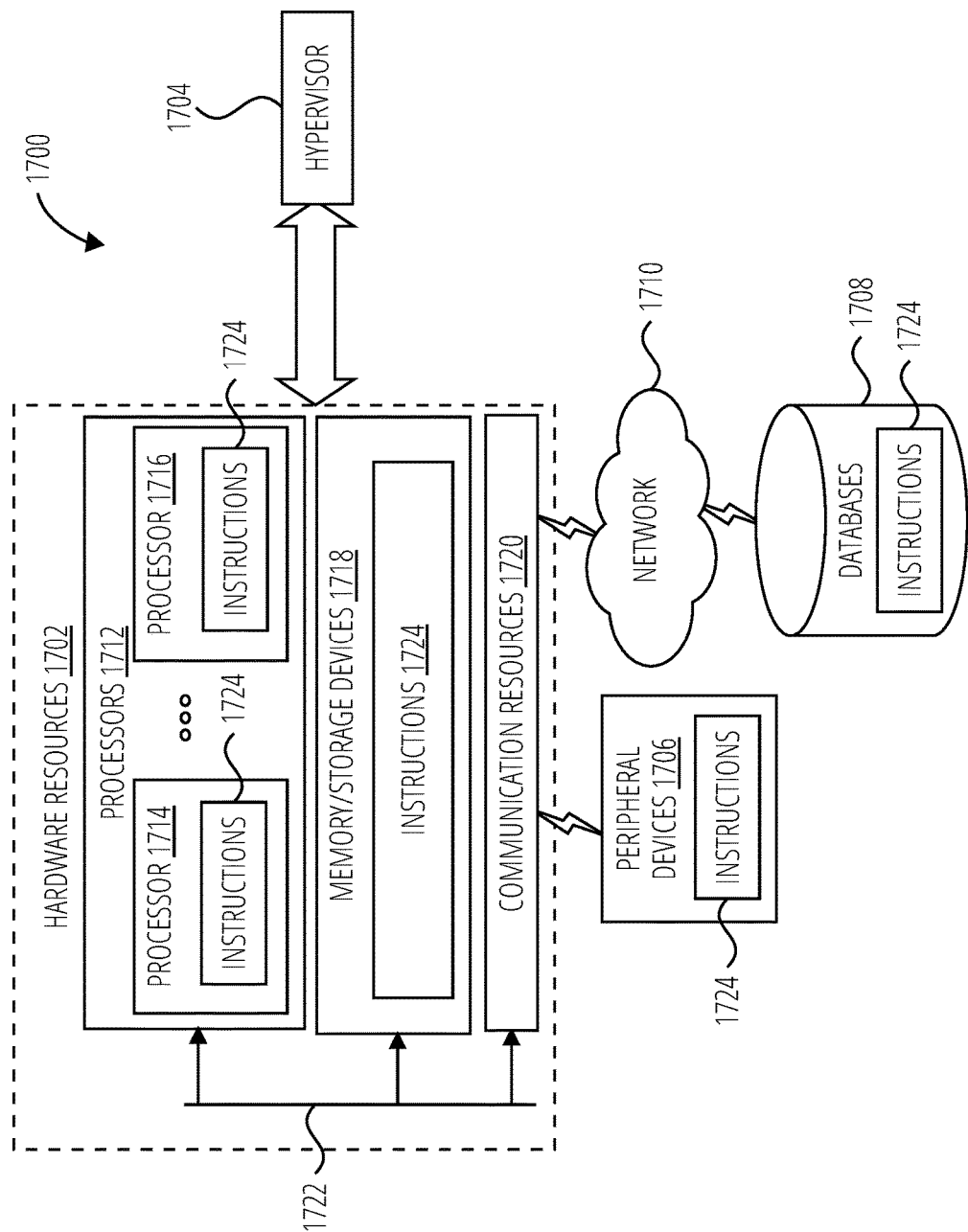
FIG. 17 illustrates components in accordance with one embodiment.

FIG. 17 is a block diagram illustrating components 1700, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1702 including one or more processors 1712 (or processor cores), one or more memory/storage devices 1718, and one or more communication resources 1720, each of which may be communicatively coupled via a bus 1722. For embodiments where node virtualization (e.g., NFV) is utilized, a hypervisor 1704 may be executed to provide an execution environment for one or more network slices/sub-slices to utilize the hardware resources 1702.

The processors 1712 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1714 and a processor 1716.

The memory/storage devices 1718 may include main memory, disk storage, or any suitable combination thereof. The memory/storage devices 1718 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1720 may include interconnection or network interface components or other suitable devices to communicate with one or more peripheral devices 1706 or one or more databases 1708 via a network 1710. For example, the communication resources 1720 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1724 may comprise software, a program, an application, an applet, an app, or other executable code for causing at least any of the processors 1712 to perform any one or more of the methodologies discussed herein. The instructions 1724 may reside, completely or partially, within at least one of the processors 1712 (e.g., within the processor's cache memory), the memory/storage devices 1718, or any suitable combination thereof. Furthermore, any portion of the instructions 1724 may be transferred to the hardware resources 1702 from any combination of the peripheral devices 1706 or the databases 1708. Accordingly, the memory of the processors 1712, the memory/storage devices 1718, the peripheral devices 1706, and the databases 1708 are examples of computer-readable and machine-readable media.

Interworking with EPC

A 5G System may interwork with a 4G EPC system either through single-registration or dual-registration mode. If RDS is supported in both 5G System and 4G System then PDU sessions or PDN connections with RDS capability may be transferred from 5G system to 4G system and vice versa. The UE has to setup the RDS transfers for each PDN connection in the target system. On transferring a PDU session from 5GS to 4GS, the EPC will map the NEF address to equivalent SCEF ID and the corresponding SCS/AS and the UE will negotiate the support for RDS in system and establish a PDN connection with the corresponding SCEF. If the NEF address cannot be mapped to SCEF ID or the corresponding SCS/AS cannot be located, or the PDN connection with appropriate SCEF cannot be established, then the RDS capability will not be supported in 4GS. The UE may continue to use the same port numbers as in 5GS in 4GS as well, if they are available, else new port numbers may be allocated in 4GS and the RDS connection established.

The following examples pertain to further embodiments.

Example 1A may include a 5G system comprising: gNB, AMF, SMF, UPF, NEF, UDM, NSSF, AUSF, AF, AS and other elements as described in 3GPP TS 23.501 and 3GPP TS 24.501.

Example 2A may include the 5G system of Example 1A and/or some other Examples herein, further comprising a UE, wherein the UE performs Reliable Data Transfer between UE and NEF using the RDS protocol as described in TS 24.250. The communication between UE and NEF is bidirectional and supports both MO/MT data delivery in roaming and non-roaming scenarios.

Example 3A may include the 5G system of Example 2A and/or some other Examples herein, wherein the communication between UE and NEF can be performed over both 3GPP and non-3GPP accesses.

Example 4A may include the 5G system of Example 2A and/or some other Examples herein, wherein the UE discovers support for RDS with NEF during the Registration procedure. The UE specifies "RDS Supported" indication over non-3GPP and 3GPP accesses in REGISTRATION_REQUEST message. The network responds with "RDS Supported" or no support indication in REGISTRATION_ACCEPT/REGISTRATION_REJECT message.

Example 5A may include the 5G system of Example 4A and/or some other Examples herein, wherein the AMF discovers the NEF address either based on pre-configuration (i.e., NEF FQDN); or the NEF address is received from the UDM; or the AMF invokes Nnrf_NFDiscovery service operation from NRF to discover the NEF address as described in clause 5.2.7.3.2 of TS 23.502.

Example 6A may include the 5G system of Example 5A and/or some other Examples herein, wherein the AMF uses the discovered NEf address and invokes Nnef_RDS_Activate service from the NEF including AMF address, Access Type, GPSI (if available) and SUPI. The NEF retrieves UE subscription data from UDM and creates UE context to store RDS configuration information.

Example 7A may include the 5G system of Example 5A and/or some other Examples herein, wherein the AF/AS establishes RDS configuration with the NEF using the Nnref_RDS_Config_Request service operation to establish routing information in NEF. The AF/AS provides external identifier for UE message and reliable data service configuration information (e.g. application port number, acknowledged or unacknowledged transfer, etc.) to the NEF.

Example 8A may include the 5G system of Example 7A and/or some other Examples herein, wherein the NEF uses Nnref_RDS_Config_Response service operation to acknowledge acceptance of the RDS Configuration Request to the AF/AS. If the RDS Configuration was accepted, the NEF will create an association between the External Identifier and SUPI in UE context. In the MT reliable small data delivery procedure, the NEF will use External Identifier to determine the SUPI and receiver port number. In the MO reliable small data delivery procedure, the NEF will use the SUPI, to determine AS/AF address and application port number from the UE context.

Example 9A may include the 5G system of Example 8A and/or some other Examples herein, wherein RDS packets are transmitted over NAS without the need to establish data radio bearers, i.e. via NAS transport message, which can carry RDS payload. UE and Network supports RDS protocol as specified in TS 24.250.

Example 10A may include a 4G system comprising of MME, P-GW, SCEF, S-GW, HSS, etc. as described in TS 23.401.

Example 11A may include a 5G system of Example 9A and/or some other Examples herein, and a 4G system of Example 10A and/or some other Examples herein, wherein the UE that supports interworking between 4G and 5G system and performs migration from 5GS to 4GS. If a PDU session supports RDS configuration in 5GS and if the UE interworks and migrates to 4G system that supports RDS configuration, then the corresponding PDN connection in 4G system will also support RDS. The same will also hold true in other direction.

Example 12A may include an apparatus comprising means to perform one or more elements of a method described in or related to any of Examples 1A-11A, or any other method or process described herein.

Example 13A may include one or more non-transitory computer-readable media comprising instructions to cause an electronic device, upon execution of the instructions by one or more processors of the electronic device, to perform one or more elements of a method described in or related to any of Examples 1A-11A, or any other method or process described herein.

Example 14A may include an apparatus comprising logic, modules, or circuitry to perform one or more elements of a method described in or related to any of Examples 1A-11A, or any other method or process described herein.

Example 15A may include a method, technique, or process as described in or related to any of Examples 1A-11A, or portions or parts thereof.

Example 16A may include an apparatus comprising: one or more processors and one or more computer readable media comprising instructions that, when executed by the one or more processors, cause the one or more processors to perform the method, techniques, or process as described in or related to any of Examples 1A-11A, or portions thereof.

Example 17A may include a signal as described in or related to any of Examples 1A-11A, or portions or parts thereof.

Example 18A may include a signal in a wireless network as shown and described herein.

Example 19A may include a method of communicating in a wireless network as shown and described herein.

Example 20A may include a system for providing wireless communication as shown and described herein.

Example 21A may include a device for providing wireless communication as shown and described herein.

Example 1B is a method for use by a user equipment (UE) to perform reliable data service for unstructured protocol data unit (PDU) sessions. The method include indicating, to a mobile communication network, a capability of the UE to support a reliable data service protocol. The method also includes processing an indication, from the mobile communication network, that the reliable data service protocol is supported by the mobile communication network. The method further includes cooperating with the mobile communication network to establish a PDU session between the UE as a first endpoint of the PDU session and a node or function in the mobile communication network as a second endpoint of the PDU session, and processing non-access stratum (NAS) messages comprising a PDU session identifier (ID) and data to communicate between the first endpoint and the second endpoint. Wherein processing the NAS messages, for both mobile originated (MO) data transfer and mobile terminated (MT) data transfer, comprises using the reliable data service protocol to determine whether PDUs of the NAS messages require no acknowledgement, require acknowledgment, or include an acknowledgement. Wherein processing the NAS messages further comprises using the reliable data service protocol to detect and eliminate duplicate PDUs received at the UE in the NAS messages.

Example 2B is the method of Example 1B, wherein using the reliable data service protocol further comprises processing packet headers to determine whether the PDUs of the NAS messages require no acknowledgement, require acknowledgment, or include the acknowledgement.

Example 3B is the method of Example 2B, wherein using the reliable data service protocol further comprises processing port numbers in the packet headers to identify applications on an originator and a receiver of the NAS messages.

Example 4B is the method of Example 1B, wherein the second endpoint of the PDU session comprises a network exposure function (NEF).

Example 5B is the method of Example 1B, wherein the second endpoint of the PDU session comprises a user plane function (UPF).

Example 6B is the method of Example 1B, wherein for the MO data transfer, the method further comprises generating an initial NAS message, for communication from the UE to an access and mobility management function (AMF) through an access node, the initial NAS message comprising an integrity protected NAS PDU, the integrity protected NAS PUD comprising the PDU session ID and uplink data as payload.

Example 7B is the method of Example 6B, wherein the initial NAS message further comprises release assistance information to indicate, to the AMF, whether the integrity protected NAS PDU is a last PDU expected so as to release a connection between the UE and the access node.

Example 8B is the method of Example 6B, further comprising processing a downlink NAS message received from the AMF comprising an acknowledgement that the initial NAS message was received by the second endpoint of the PDU session.

Example 9B is the method of Example 8B, wherein the downlink NAS message further comprises the PDU session ID.

Example 10B is the method of Example 1B, wherein for the MT data transfer, the method further comprises processing a downlink NAS message received from an access and mobility management function (AMF) through an access node, the downlink NAS message comprising the PDU session ID and downlink data as payload.

Example 11B is the method of Example 10B, further comprising, in response to determining that a PDU header in the NAS message indicates that an acknowledgment is requested, generating an uplink NAS message to communicate from the UE to the AMF through the access node, wherein the uplink NAS message comprises the acknowledgment.

Example 12B is the method of Example 10B, wherein when the UE is in a connection management (CM) idle state, before processing the downlink NAS message, the method further comprises: processing a paging message from the access node; and in response to the paging message, generating an initial NAS message or service request to send to the AMF.

Example 13B is a method for a network exposure function (NEF) to provide reliable non-internet protocol (IP) data delivery in a wireless network. The method includes: processing a configuration request, from an application function (AF), to configure non-IP data delivery, the configuration request including a user equipment (UE) identifier; in response to the configuration request, generating a unified data management (UDM) request to determine whether the configuration request for the UE identifier is authorized; processing a UDM response indicating authorization for non-IP data delivery, the UDM response comprising a subscription permanent identifier (SUPI) mapped to the UE identifier; and in response to the UDM response: generating a configuration response to acknowledge acceptance of the configuration request to the AF; and creating an association between the UE identifier and the SUPI in a UE context.

Example 14B is the method of Example 13B, wherein the UE identifier is selected from a group comprising an external UE identifier and a general public subscription identifier (GPSI).

Example 15B is the method of Example 13B, further comprising: cooperating with at least one of an access and mobility management function (AMF) and a session management function (SMF) to establish a non-IP protocol data unit (PDU) session between the NEF and the UE; and maintaining an association of at least a PDU session identifier, the UE identifier, and the SUPI.

Example 16B is the method of Example 15B, further comprising, in a mobile terminated (MT) procedure for non-IP data delivery, using at least the UE identifier to determine the SUPI and a receiver port number.

Example 17B is the method of Example 16B, further comprising using at least the UE identifier in the MT procedure to determine the PDU session identifier.

Example 18B is the method of Example 15B, further comprising, in a mobile originated (MO) procedure for non-IP data delivery, using the SUPI to determine at least one of an address corresponding to the AF and an application port number corresponding to the UE.

Example 19B is the method of Example 18B, further comprising using the PDU session identifier to at least one of the address corresponding to the AF and the application port number corresponding to the UE.

Example 20B is a method for an access and mobility management function (AMF) to provide mobile originated (MO) data transport in a communication network. The method includes: processing a non-access stratum (NAS) message from a user equipment (UE), the NAS message comprising a protocol data unit (PDU) session identifier (ID) and uplink data; checking integrity of and decrypting the NAS message comprising the PDU session ID and the uplink data; determining, based on the PDU session ID, a session management function (SMF); routing the PDU session ID and the uplink data to the SMF for forwarding to a function in the communication network; and generating a downlink NAS transport message to communicate to the UE, the downlink NAS transport message comprising the PDU session ID and downlink data provided from the function in the communication network through the SMF.

Example 21B is the method of Example 20B, further comprising, in response to an indication that the UE supports reliable data service (RDS), determining whether a header in the NAS message from the UE indicates a PDU of the NAS message requires no acknowledgement, requires acknowledgment, or includes an acknowledgement of prior downlink data.

Example 22B is the method of Example 21B, wherein the downlink data comprising an acknowledgement of the uplink data.

Example 23B is the method of Example 20B, wherein the function in the communication network comprises a network exposure function (NEF) or a user plane function (UPF).

Example 24B is the method of Example 20B, wherein the NAS message from the UE further comprises release assistance information indicating whether the NAS message comprises a last PDU expected, and wherein the method further comprises releasing, based on the release assistance information indicating that the NAS message comprises a last PDU expected, a connection between the UE and an access node.

Example 25B is a method for an access and mobility management function (AMF) to provide mobile terminated (MT) data transport in a communication network. The method includes: processing a non-access stratum (NAS) message and a protocol data unit (PDU) session identifier (ID) from a session management function (SMF), the NAS message comprising downlink data from a function in the communication network; generating an integrity protected and encrypted downlink NAS transport message comprising the PDU session ID and the NAS message from the SMF; and forwarding the downlink NAS transport message to an access node for delivery to a user equipment (UE) associated with the PDU session ID.

Example 26B is the method of Example 25B, wherein the PDU session is of an unstructured type, reliable data service (RDS) is enabled, and wherein the downlink NAS transport message includes an indication that RDS acknowledgement is requested.

Example 27B is the method of Example 26B, the method further comprising processing an uplink NAS message from the UE, the uplink NAS message comprising an acknowledgement of the downlink data.

Example 28B is the method of Example 25B, wherein the function in the communication network comprises a network exposure function (NEF) or a user plane function (UPF).

Example 29B is the method of Example 25B, further comprising, in respond to determining that the UE is in a connection management (CM) idle state, before forwarding the downlink NAS transport message to the access node for delivery to the UE, sending a paging message to the access node to perform paging of the UE.

Example 30B is a computing apparatus comprising a processor and a memory storing instructions that, when executed by the processor, configure the apparatus to: indicate, to a mobile communication network, a capability of the UE to support a reliable data service protocol; process an indication, from the mobile communication network, that the reliable data service protocol is supported by the mobile communication network; cooperate with the mobile communication network to establish a PDU session between the UE as a first endpoint of the PDU session and a node or function in the mobile communication network as a second endpoint of the PDU session; and process non-access stratum (NAS) messages comprising a PDU session identifier (ID) and data to communicate between the first endpoint and the second endpoint, wherein processing the NAS messages, for both mobile originated (MO) data transfer and mobile terminated (MT) data transfer, comprises use the reliable data service protocol to determine whether PDUs of the NAS messages require no acknowledgement, require acknowledgment, or include an acknowledgement, and wherein processing the NAS messages further comprises use the reliable data service protocol to detect and eliminate duplicate PDUs received at the UE in the NAS messages.

Example 31B is the computing apparatus of Example 30B, wherein using the reliable data service protocol further comprises process packet headers to determine whether the PDUs of the NAS messages require no acknowledgement, require acknowledgment, or include the acknowledgement.

Example 32B is the computing apparatus of Example 31B, wherein using the reliable data service protocol further comprises process port numbers in the packet headers to identify applications on an originator and a receiver of the NAS messages.

Example 33B is the computing apparatus of Example 30B, wherein the second endpoint of the PDU session comprises a network exposure function (NEF).

Example 34B is the computing apparatus of Example 30B, wherein the second endpoint of the PDU session comprises a user plane function (UPF).

Example 35B is the computing apparatus of Example 30B, wherein for the MO data transfer, the method further comprises generate an initial NAS message, for communication from the UE to an access and mobility management function (AMF) through an access node, the initial NAS message comprising an integrity protected NAS PDU, the integrity protected NAS PUD comprising the PDU session ID and uplink data as payload.

Example 36B is the computing apparatus of Example 35B, wherein the initial NAS message further comprises release assistance information to indicate, to the AMF, whether the integrity protected NAS PDU is a last PDU expected so as to release a connection between the UE and the access node.

Example 37B is the computing apparatus of Example 35B, wherein the instructions further configure the apparatus to process a downlink NAS message received from the AMF comprising an acknowledgement that the initial NAS message was received by the second endpoint of the PDU session.

Example 38B is the computing apparatus of Example 37B, wherein the downlink NAS message further comprises the PDU session ID.

Example 39B is the computing apparatus of Example 30B, wherein for the MT data transfer, the method further comprises process a downlink NAS message received from an access and mobility management function (AMF) through an access node, the downlink NAS message comprising the PDU session ID and downlink data as payload.

Example 40B is the computing apparatus of Example 39B, wherein the instructions further configure the apparatus to, in response to determining that a PDU header in the NAS message indicates that an acknowledgment is requested, generate an uplink NAS message to communicate from the UE to the AMF through the access node, wherein the uplink NAS message comprises the acknowledgment.

Example 41B is the computing apparatus of Example 39B, wherein when the UE is in a connection management (CM) idle state, before process the downlink NAS message, the method further comprises: process a paging message from the access node; and in response to the paging message, generating an initial NAS message or service request to send to the AMF.

Example 42B is a computing apparatus comprising: a processor and a memory storing instructions that, when executed by the processor, configure the apparatus to: process a configuration request, from an application function (AF), to configure non-IP data delivery, the configuration request including a user equipment (UE) identifier; in response to the configuration request, generating a unified data management (UDM) request to determine whether the configuration request for the UE identifier is authorized; process a UDM response indicating authorization for non-IP data delivery, the UDM response comprising a subscription permanent identifier (SUPI) mapped to the UE identifier; and in response to the UDM response: generate a configuration response to acknowledge acceptance of the configuration request to the AF; and create an association between the UE identifier and the SUPI in a UE context.

Example 43B is the computing apparatus of Example 42B, wherein the UE identifier is selected from a group comprising an external UE identifier and a general public subscription identifier (GPSI).

Example 44B is the computing apparatus of Example 42B, wherein the instructions further configure the apparatus to: cooperate with at least one of an access and mobility management function (AMF) and a session management function (SMF) to establish a non-IP protocol data unit (PDU) session between the NEF and the UE; and maintain an association of at least a PDU session identifier, the UE identifier, and the SUPI.

Example 45B is the computing apparatus of Example 44B, wherein the instructions further configure the apparatus to, in a mobile terminated (MT) procedure for non-IP data delivery, use at least the UE identifier to determine the SUPI and a receiver port number.

Example 46B is the computing apparatus of Example 45B, wherein the instructions further configure the apparatus to use at least the UE identifier in the MT procedure to determine the PDU session identifier.

Example 47B is the computing apparatus of Example 44B, wherein the instructions further configure the apparatus to, in a mobile originated (MO) procedure for non-IP data delivery, use the SUPI to determine at least one of an address corresponding to the AF and an application port number corresponding to the UE.

Example 48B is the computing apparatus of Example 47B, wherein the instructions further configure the apparatus to use the PDU session identifier to at least one of the address corresponding to the AF and the application port number corresponding to the UE.

Example 49B is a non-transitory computer-readable storage medium, the computer-readable storage medium including instructions that when executed by a computer, cause the computer to: process a non-access stratum (NAS) message from a user equipment (UE), the NAS message comprising a protocol data unit (PDU) session identifier (ID) and uplink data; check integrity of and decrypting the NAS message comprising the PDU session ID and the uplink data; determine, based on the PDU session ID, a session management function (SMF); rout the PDU session ID and the uplink data to the SMF for forwarding to a function in the communication network; and generate a downlink NAS transport message to communicate to the UE, the downlink NAS transport message comprising the PDU session ID and downlink data provided from the function in the communication network through the SMF.

Example 50B is the computer-readable storage medium of Example 49B, wherein the instructions further configure the computer to, in response to an indication that the UE supports reliable data service (RDS), determine whether a header in the NAS message from the UE indicates a PDU of the NAS message requires no acknowledgement, requires acknowledgment, or includes an acknowledgement of prior downlink data.

Example 51B is the computer-readable storage medium of Example 50B, wherein the downlink data comprising an acknowledgement of the uplink data.

Example 52B is the computer-readable storage medium of Example 49B, wherein the function in the communication network comprises a network exposure function (NEF) or a user plane function (UPF).

Example 53B is the computer-readable storage medium of Example 49B, wherein the NAS message from the UE further comprises release assistance information indicate whether the NAS message comprises a last PDU expected, and wherein the method further comprises releasing, based on the release assistance information indicating that the NAS message comprises a last PDU expected, a connection between the UE and an access node.

Example 54B is a non-transitory computer-readable storage medium, the computer-readable storage medium including instructions that when executed by a computer, cause the computer to: process a non-access stratum (NAS) message and a protocol data unit (PDU) session identifier (ID) from a session management function (SMF), the NAS message comprising downlink data from a function in the communication network; generate an integrity protected and encrypted downlink NAS transport message comprising the PDU session ID and the NAS message from the SMF; and forward the downlink NAS transport message to an access node for delivery to a user equipment (UE) associated with the PDU session ID.

Example 55B is the computer-readable storage medium of Example 54B, wherein the PDU session is of an unstructured type, reliable data service (RDS) is enabled, and wherein the downlink NAS transport message includes an indication that RDS acknowledgement is requested.

Example 56B is the computer-readable storage medium of Example 55B, the method wherein the instructions further configure the computer to process an uplink NAS message from the UE, the uplink NAS message comprising an acknowledgement of the downlink data.

Example 57B is the computer-readable storage medium of Example 54B, wherein the function in the communication network comprises a network exposure function (NEF) or a user plane function (UPF).

Example 58B is the computer-readable storage medium of Example 54B, wherein the instructions further configure the computer to, in respond to determining that the UE is in a connection management (CM) idle state, before forward the downlink NAS transport message to the access node for delivery to the UE, sending a paging message to the access node to perform paging of the UE.

Example 59B is a computing apparatus including a processor and a memory storing instructions that, when executed by the processor, configure the apparatus to perform the method of any one of Examples 1B-29B.

Example 60B is a non-transitory computer-readable storage medium including instructions that, when processed by a computer, configure the computer to perform the method of any one of Examples 1B-29B.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method to be performed at an access and mobility management function (AMF) configured to provide mobile terminated (MT) data transport in a communication network, the method comprising:
    processing a non-access stratum (NAS) message and a protocol data unit (PDU) session identifier (ID) from a session management function (SMF), the NAS message comprising downlink data from a function in the communication network;
    generating an integrity protected and encrypted downlink NAS transport message comprising the PDU session ID and the NAS message from the SMF; and
    forwarding the downlink NAS transport message to an access node for delivery to a user equipment (UE) associated with the PDU session ID;
    wherein the PDU session is of an unstructured type, reliable data service (RDS) is enabled, and wherein the downlink NAS transport message includes an indication that RDS acknowledgement is requested.

2. The method of claim 1, further including processing an uplink NAS message from the UE, the uplink NAS message comprising an acknowledgement of the downlink data.

3. The method of claim 1, wherein the function in the communication network comprises a network exposure function (NEF) or a user plane function (UPF).

4. The method of claim 1, further including, in response to determining that the UE is in a connection management (CM) idle state, before forwarding the downlink NAS transport message to the access node for delivery to the UE, sending a paging message to the access node to perform paging of the UE.

5. The method of claim 1, further including transmitting and receiving wireless signals to and from the SMF and the access node.

6. An apparatus of an access and mobility management function (AMF) configured to provide mobile originated (MO) data transport in a communication network, the apparatus comprising:
    a memory interface to send or receive, to or from a memory device, a protocol data unit (PDU) session identifier (ID); and
    a processor to:
        process a non-access stratum (NAS) message from a user equipment (UE), the NAS message comprising a protocol data unit (PDU) session identifier (ID) and uplink data;
        check integrity of and decrypt the NAS message comprising the PDU session ID and the uplink data;
        determine, based on the PDU session ID, a session management function (SMF);

route the PDU session ID and the uplink data to the SMF for forwarding to a function in the communication network;

generate a downlink NAS transport message to communicate to the UE, the downlink NAS transport message comprising the PDU session ID and downlink data provided from the function in the communication network through the SMF; and determine port numbers in a header of the NAS message from the UE to identify an application on an originator and an application on a receiver of the NAS message from the UE.

7. The apparatus of claim 6, the processor to further, in response to an indication that the UE supports reliable data service (RDS), determine whether the header in the NAS message from the UE indicates a PDU of the NAS message requires no acknowledgement, requires acknowledgment, or includes an acknowledgement of prior downlink data.

8. The apparatus of claim 6, wherein the downlink data comprises an acknowledgement of the uplink data.

9. The apparatus of claim 6, wherein the function in the communication network comprises a network exposure function (NEF) or a user plane function (UPF).

10. The apparatus of claim 6, wherein the NAS message from the UE further comprises release assistance information to indicate whether the NAS message comprises a last PDU expected, and wherein the processor is further to release, based on the release assistance information indicating that the NAS message comprises a last PDU expected, a connection between the UE and an access node.

11. A method to be performed at an apparatus of a user equipment (UE), the UE to perform reliable data service for unstructured protocol data unit (PDU) sessions, the method comprising:

indicating, to a core network, a capability of the UE to support a reliable data service protocol;

processing an indication, from the core network, that the reliable data service protocol is supported by the core network;

causing to establish the unstructured PDU session between the UE as a first endpoint of the PDU session and a node or function in the core network as a second endpoint of the PDU session; and processing non-access stratum (NAS) messages comprising a PDU session ID and data to communicate between the first endpoint and the second endpoint, wherein the method further includes, for both mobile originated (MO) data transfer and mobile termination (MT) data transfer, in response to a determination that reliable data service is enabled, using the reliable data service protocol to identify if PDUs of the NAS messages require no acknowledgement, require an acknowledgment, or are an acknowledgement, and to detect and eliminate duplicate PDUs received at a receiving one of the first or second endpoint in the NAS messages, wherein using the reliable data service protocol further comprises processing packet headers to identify if the PDUs of the NAS messages require no acknowledgement, require an acknowledgment, or are the acknowledgement, and wherein using the reliable data service protocol further comprises processing port numbers in the packet headers to identify applications on an originator and a receiver of the NAS messages.

12. The method of claim 11, wherein the second endpoint of the PDU session comprises a network exposure function (NEF).

13. The method of claim 11, wherein the second endpoint of the PDU session comprises a user plane function (UPF).

14. The method of claim 11, wherein for the MO data transfer, the method further includes generating an initial NAS message, for communication from the UE to an access and mobility management function (AMF) through an access node, the initial NAS message comprising an integrity protected NAS PDU, the integrity protected NAS PDU comprising the PDU session ID and uplink data as payload.

15. The method of claim 14, wherein the initial NAS message further comprises release assistance information to indicate, to the AMF, whether the integrity protected NAS PDU is a last PDU expected so as to release a connection between the UE and the access node.

16. The method of claim 14, further including processing a downlink NAS message received from the AMF comprising an acknowledgement that the initial NAS message was received by the second endpoint of the PDU session.

17. The method of claim 16, wherein the downlink NAS message further comprises the PDU session ID.

18. The method of claim 11, further including, for the MT data transfer, processing a downlink NAS message received from an access and mobility management function (AMF) through an access node, the downlink NAS message comprising the PDU session ID and downlink data as payload.

19. The method of claim 18, further including, in response to determining that a PDU header in the NAS message indicates that an acknowledgment is requested, generating an uplink NAS message to communicate from the UE to the AMF through the access node, wherein the uplink NAS message comprises the acknowledgment.

20. The method of claim 18, wherein when the UE is in a CM idle state, the method further including, before processing the downlink NAS message:

processing a paging message from the access node; and in response to the paging message, generating an initial NAS message or service request to send to the AMF.

* * * * *